(12) United States Patent
Weigelt et al.

(10) Patent No.: US 11,727,105 B2
(45) Date of Patent: Aug. 15, 2023

(54) METHOD AND DEVICE FOR MULTI-FACTOR AUTHENTICATION ON A CAPACITIVE AREA SENSOR

(71) Applicant: Prismade Labs Gmbh, Chemnitz (DE)

(72) Inventors: Karin Weigelt, Chemnitz (DE); Jan Thiele, Chemnitz (DE); Marko Illing, Chemnitz (DE); Johannes Köpcke, Chemnitz (DE)

(73) Assignee: PRISMADE LABS GMBH, Chemnitz (DE)

( * ) Notice: Subject to any disclaimer, the term of this patent is extended or adjusted under 35 U.S.C. 154(b) by 0 days.

(21) Appl. No.: 17/293,295

(22) PCT Filed: Nov. 13, 2019

(86) PCT No.: PCT/EP2019/081160
§ 371 (c)(1),
(2) Date: May 12, 2021

(87) PCT Pub. No.: WO2020/099477
PCT Pub. Date: May 22, 2020

(65) Prior Publication Data
US 2021/0397693 A1    Dec. 23, 2021

(30) Foreign Application Priority Data
Nov. 13, 2018   (EP) .................................. 18205829

(51) Int. Cl.
*G06F 21/40*   (2013.01)
*G06F 3/039*   (2013.01)
*G06F 3/044*   (2006.01)

(52) U.S. Cl.
CPC ............ *G06F 21/40* (2013.01); *G06F 3/0393* (2019.05); *G06F 3/044* (2013.01)

(58) Field of Classification Search
CPC ......... G06F 3/044; G06F 21/40; G06F 3/0393
See application file for complete search history.

(56) References Cited

U.S. PATENT DOCUMENTS 9,436,335 B1 *   9/2016   Scherer ................... G06F 3/023

FOREIGN PATENT DOCUMENTS

WO           2018141478 A1     8/2018

OTHER PUBLICATIONS

Int'l Search Report for PCT/EP2019/081160, dated Jan. 7, 2020.

* cited by examiner

*Primary Examiner* — Yaron Cohen
(74) *Attorney, Agent, or Firm* — MaxGoLaw PLLC

(57) ABSTRACT

A method for multi-factor authentication on a device with a capacitive area sensor is provided in which a device with an electrically conductive structure on a non-conductive substrate represents a first authentication factor and information for the execution of an input sequence on the device represents a second authentication factor. Authentication can be performed by means of a comparison with reference data, in accordance with the likelihood with which a signal detected by the area sensor was generated by a combination of the first and second authentication factors. A device, a system and a kit for executing the method for multi-factor authentication on a capacitive area sensor. are provided.

14 Claims, 10 Drawing Sheets

TAN variant

TAN variant

PIN variant

METHOD AND DEVICE FOR MULTI-FACTOR AUTHENTICATION ON A CAPACITIVE AREA SENSOR

The invention relates preferably to a method for multi-factor authentication on a device with a capacitive area sensor, wherein a device with an electrically conductive structure on a non-conductive substrate represents a first authentication factor and information for the execution of an input sequence on the device represents a second authentication factor. Authentication can be performed by means of a comparison with reference data, in accordance with the likelihood with which a signal detected by the area sensor was generated by a combination of the first and second authentication factors. The invention also relates preferably to a device, a system, and a kit for executing the method for multi-factor authentication on a capacitive area sensor.

BACKGROUND AND PRIOR ART

Mobile terminals with capacitive area sensors in the form of touchscreens are used by millions of users in everyday life. On such devices, the user typically uses his finger or a suitable conductive object, for example a stylus, to perform applications such as typing, reading, surfing the Internet, playing games or controlling software. Because of their ease of use, these devices have revolutionized the way people communicate, work, converse, or access information.

At the same time, with increasing digitization, secure user identification—especially for security-relevant processes and applications—is becoming more and more important. For example, online banking is now routinely done via smartphones or touchpads. Conventional authentication methods are based on the use of PIN codes or TANs (transaction numbers). However, the coded information necessary for authentication can easily be copied or misused.

In 2010, WO 2010/043422 A1 proposed to exploit the ability of capacitive area sensors to detect conductive patterns to provide a data carrier that can be used for authentication in games. The data carrier is in the form of a flat card and comprises an electrically conductive layer on a non-conductive substrate.

The following prior art has in the meantime developed in this field:

The system proposed in WO 2011/154524 A1 allows the principle to be used to transfer information to a capacitive area sensor in the form of a touchscreen. The information carrier provided for this purpose has an electrically conductive layer with an electrically non-conductive substrate, wherein the electrically conductive layer is configured as a "touch structure" and comprises at least one touch point, a coupling surface, and/or a conductor path. The touch points emulate the characteristics of fingertips so that they are reliably recognized by a touchscreen. A coding of the information is based particularly on the positions of the touch points.

WO 2012/072648 A1 describes a method for capturing information from an information carrier using a capacitive touchscreen. This application relates in content to a system similar to the aforementioned writing. The information carrier described essentially consists of two different materials that differ with respect to conductivity or a dielectric coefficient. A relative movement between the information carrier and the touchscreen causes an interaction between the information carrier and the area sensor, which interaction is based on the different material properties and generates a touch signal. Also in this document, the electrically conductive pattern includes the basic elements of touch points, coupling area, and conductor tracks, wherein the conductor tracks connect the touch points to each other and/or to the coupling area.

WO 2012/172105 A1 describes a means for unidirectional or bidirectional data transmission between a transmitting and/or receiving device and a device comprising a touchscreen, which device is suitable to be used for authorization or authentication. The device has at least one control unit comprising digital or analog circuitry, i.e., the device is active electronics that is expensive to manufacture and thus cannot be made available to users in large or very large quantities.

The aforementioned applications share the basic idea of using an electrically conductive structure to simulate the properties of fingertips in order to enable information carriers to be read on capacitive touchscreens. The authentication information stored in the information carrier is essentially based on the relative positions of the electrically conductive subareas or touch points among each other, which can be detected as touch events on a touchscreen. The number of identification codes that can be displayed is therefore limited.

WO 2018/141478 A1 describes a method for generating a time-dependent signal on a capacitive area sensor, the conductive structure of which consists of many single elements and wherein the time-dependent signal is generated by a relative movement between an input means and the card-like object. The card-like object can be used, for example, to unlock digital content on a mobile device. The use of single elements in connection with a relative movement between an input means and the card-like object allows the provision of a larger number of identification codes, which can increase the security of an authentication. Nonetheless, the possibility of loss or theft of the card-like object poses a risk, as it can be activated for authentication by any possibly unauthorized user.

In prior art, it is also known to increase the security of authentication procedures by means of so-called multi-factor authentication (MFA). Multi-factor authentication or multi-factor authentication is a form of user identification in which access authorization is verified by several independent characteristics (factors). In two-factor authentication, which is a special form of MFA, two independent factors are checked.

Two-factor authentication is always successful only if both specified factors are used together and are correct. If a factor is missing or used incorrectly, the access authorization cannot be determined beyond doubt and access is denied.

In the prior art, various factors are known which are used in an MFA. These include a secrecy-protecting object (for example, a security token, a bank card, a short-term password generator or a physical key), secret knowledge (for example, a passphrase, a one-time password, a personal identification number (PIN) or a transaction number (TAN)) or biometric characteristics (for example, a fingerprint, the pattern of an iris (iris recognition), the human voice or the gait pattern).

For security-related applications, for example, it is preferable to use a combination of credit card with personal identification number (PIN) or password and transaction number (TAN). For digital applications, however, there are efforts to simplify the process. In online services, such as e-banking apps, the login interface and the provision of a mobile TAN are therefore often made accessible on the same terminal. While this increases user-friendliness, it creates a security gap since both factors are transmitted over the same transmission channel.

In light of the prior art, there is thus a need for the provision of alternative or improved devices or methods for authentication on devices with capacitive area sensors, particularly on mobile terminals such as smartphones, touchpads or the like.

Problem of the Invention

It is the problem of the invention to provide a method, device, kit, and/or system for authentication on a device with a capacitive area sensor, which do not have the disadvantages of the prior art. Particularly, it was a problem of the invention to provide a method or a device which is characterized by a high degree of security and at the same time high user-friendliness.

SUMMARY OF THE INVENTION

This problem is solved by the features of the independent claims. Advantageous embodiments of the invention are described in the dependent claims.

The invention relates to a method for multi-factor authentication on a device with a capacitive area sensor, comprising the steps of
a) providing a device comprising a capacitive area sensor
b) providing a device with an electrically conductive structure on a non-conductive substrate, wherein the electrically conductive structure represents a first authentication factor
c) providing information for executing an input sequence on the device, wherein the information represents a second authentication factor
d) placing the device onto the capacitive area sensor
e) performing an input sequence on the device using an input means
f) evaluating the signal detected by the area sensor during the input sequence and comparing it to reference data, wherein authentication is performed based on the likelihood with which the detected signal was generated by a combination of the first and second authentication factors.

By combining a device with an electrically conductive structure as a first authentication factor with information for executing an input sequence on the device as a second authentication factor, a highly secure and at the same time user-friendly authentication method can be provided in a surprisingly simple way.

In terms of multi-factor authentication, the device can be understood as a secret-keeping item that must be in the user's possession at the time of authentication. The physical device, for example in the form of a card, contains an electrically conductive structure as the first authentication factor. In addition, secret information is provided as a second factor for authentication, for example in the form of a personal identification number (PIN), an unlock gesture or pattern, or in another form provided for executing an input sequence.

Advantageously, a user must both be in possession of the device as a physical object and have knowledge of the secret information for the input sequence to effect successful authentication.

On the one hand, the device or the electrically conductive structure stored in it cannot be copied or can only be copied at great expense. While a CVV code on the back of a credit card, for example, can be copied by a third party in an inconsiderate moment, this is not possible for the electrically conductive structure. Nevertheless, the device is not limited to applications with special readers. Instead, authentication can advantageously be performed using any mobile device, e.g., a smartphone or tablet, which are equipped with capacitive touchscreens as standard. The data or the information for the first authentication factor is preferably present in the shape and/or design of the electrically conductive structure, which is accordingly capacitively readable. For the purposes of the invention, the device is therefore also referred to as a capacitive information carrier or capacitive data carrier.

On the other hand, the device alone is not sufficient to effect successful authentication. If the device fell into the wrong hands, a user would not be able to complete the authentication without knowing the information to perform an input sequence.

As a necessary second authentication factor, the preferred secret information provides a significant further hurdle that effectively avoids tampering or incorrect authentication. In contrast to prior art devices with an electrically conductive structure, neither placing the device on a capacitive area sensor nor making a self-explanatory movement on the touchscreen is sufficient for authentication.

Instead, knowing a piece of information for performing a correct input sequence is indispensable for successful authentication.

An input sequence in the meaning of the invention preferably means performing a sequential input on the device according to predetermined information. For example, the information for the input sequence may be a sequence of numbers or letters, wherein the input sequence preferably corresponds to a typing sequence of that sequence of numbers or letters on a respectively marked keyboard of the device. Similarly, the input sequence can be deliberate sweeping motions on the device, for example, using a keyboard that is also marked, or using other visual indications on the device.

Since the input sequence is preferably performed using predetermined information for executing the input sequence, the present description partially conceptually equates the two aspects. For example, the input sequence may be referred to as a number sequence, where it is apparent that the abstract information of the number sequence corresponds to "input sequence execution information," while the physical performance of the input, for example typing in the number sequence, corresponds to the actual "input sequence."

Preferably, the device is adapted to allow or guide a user through a plurality of possible input sequences. To this end, the device may include, for example, visually marked input areas, such as keypads or other patterns. Preferably, if an unauthorized user were to steal the device, that user would not be able to identify which input sequence to perform based on the device or the visual input area marked thereon. The second authentication factor is thus characterized by an information content that corresponds to significantly more than a self-explanatory gesture for performing a movement.

Instead, a plurality of input sequences are preferably conceivable or executable on the device, of which only one correct input sequence leads to authentication.

Here, authentication is preferably based on the evaluation of the signal detected on the area sensor during the input sequence and a comparison with reference data, wherein authentication depends on whether the detected signal can be generated by a combination of the first and second authentication factors.

It should be noted that, although in preferred embodiments the process steps may be carried out in the above order a)-f), the process is not limited to this order. For example, it may be preferable to carry out process steps a) to c) simultaneously, in combination, or in a different sequence. Similarly, the information for performing an input sequence according to step c) may also be provided or made after the device is placed on the area sensor according to step d). This may for example be the case in preferred embodiments, to the extent that the information is displayed as a prompting signal from a device to the user.

In line with the purpose of the invention, authentication advantageously exploits the fact that the presence of an electrically conductive structure, together with the performance of an input sequence related thereto, results in a characteristic, tamper-proof signal on a capacitive area sensor.

For the purposes of the invention, the term "capacitive area sensor" preferably refers to input interfaces of electronic devices. A special form of the "capacitive area sensor" is the touchscreen, which in addition to the input interface also serves as an output device or display. Devices with a capacitive area sensor are able to perceive external influences or impacts, for example touches or contacts on the surface, and evaluate them by means of attached logic. Such area sensors are used, for example, to make machines easier to operate. Typically, area sensors are provided in an electronic device and may include, but are not limited to, smartphones, cell phones, displays, tablet PCs, tablet notebooks, touchpad devices, graphics tablets, televisions, PDAs, MP3 players, trackpads, and/or capacitive input devices.

Preferably, these are multitouch-capable capacitive area sensors. Such area sensors are preferably set up to detect multiple touches simultaneously, allowing, for example, elements displayed on a touchscreen to be rotated or scaled.

The term "device including an area sensor" or "device having an area sensor" preferably refers to electronic devices, such as those mentioned above, which are capable of further evaluating the information provided by the capacitive area sensor. In preferred embodiments, the devices are mobile terminals.

Touchscreens are preferably also referred to as area sensors or sensor screens. An area sensor does not necessarily have to be used in conjunction with a display or a touchscreen, i.e. it does not necessarily have to have a display. It may be equally preferred in for the purpose of the invention that the area sensor is visibly or non-visibly integrated in devices, objects, and/or fixtures.

Area sensors particularly comprise at least one active circuit, preferably called a touch controller, which may be connected to a structure of electrodes. Area sensors are known in the prior art whose electrodes comprise groups of electrodes that differ from one another, for example, in their function. The electrode structure can also preferably be called an "electrode grid" for the purpose of the invention. It is preferred for the purpose of the invention that the electrode grid of an area sensor comprises groups of electrodes, wherein the groups of electrodes differ from each other, for example, in their function. These can be, for example, transmitting and receiving electrodes which, in a particularly preferred arrangement, can be arranged in columns and rows, i.e. particularly forming nodes or intersections at which at least one transmitting and one receiving electrode each intersect or overlap. Preferably, the intersecting transmitting and receiving electrodes in the region of the nodes are aligned with respect to each other such that they enclose substantially 90° angles.

Terms such as substantially, about, approximately, ca., etc. preferably describe a tolerance range of less than ±20%, preferably less than ±10%, more preferably less than ±5%, and particularly less than ±1%. Indications of substantially, approximately, about, ca., etc. always disclose and include the exact value indicated.

An electrostatic field is preferably formed between the transmitting and receiving electrodes of the area sensor, which field reacts sensitively to changes or capacitive interactions. These changes can be caused, for example, by touching the surface of the area sensor with a finger, a conductive object, and/or an electrically conductive structure. Capacitive interaction, for example an outflow of charges to the finger or a conductive object, leads particularly to local potential changes within the electrostatic field, which is preferably caused by the fact that, for example, the electric field between the transmitting and receiving electrodes is locally reduced by a touch of a contact surface of an electrically conductive structure. Such a change in the potential conditions is preferably detected and further processed by the electronics of the touch controller.

For this purpose, it is preferred that the touch controller controls the electrodes in such a way that a signal is transmitted between one or several transmitting electrodes and one or several receiving electrodes in each case, which signal can preferably be an electrical signal, for example a voltage, a current, or a potential (difference). These electrical signals in a capacitive area sensor are preferably evaluated by the touch controller and processed for the operating system of the device.

The information transmitted from the touch controller to the operating system describes so-called individual "touches" or "touch events," each of which can be thought of as individual detected touches or can be described as individual inputs. These touches are preferably characterized by the parameters "x-coordinate of the touch," "y-coordinate of the touch," "time stamp of the touch," and "type of the touch." The "x and y coordinate" parameters describe the position of the input on the touchscreen. Each pair of coordinates is preferably associated with a time stamp describing when the input occurred at the respective location. The "touch event type" parameter describes the detected state of the input on the touchscreen. Among others, the types Touch Start, Touch Move, Touch End, and Touch Cancel are known to the specialist. A touch input can be described on the capacitive area sensor with the help of the parameters Touch Start, at least one of Touch Move and Touch End, as well as the associated coordinates and time stamps.

It is preferred and known in the prior art as multi-touch technology that several touch inputs can be evaluated simultaneously. Projected capacitance touch technology (PCT) is an exemplary technology that allows multi-touch operation.

In the usual use of mobile terminals, the electric field between the electrodes is locally reduced by a touch with a finger or an electrically conductive object, i.e. "charges are drawn off." Likewise, placing a device with an electrically conductive structure on it and performing an input sequence on it by means of an input device also changes the electric field and generates a characteristic signal or is detected by the touch controller.

For the purpose of the invention, the "signal generated or detected on the area sensor during the input sequence" is preferably understood to mean that signal which is detected by the area sensor as a result of the capacitive interaction between the electrically conductive structure, input means, and area sensor during the performance of the input sequence. It is thus preferably a dynamic signal, for example in the form of sequential coordinate positions of touch events, which are processed by the area sensor. The detected or generated signal is therefore preferably also referred to as a time-dependent signal.

In the case of performing an input sequence directly on the area sensor, the signal would match, for example, a typing sequence or a sweep gesture, exclusively based on the input sequence. In the case of smartphones, for example, it is known to use such input sequences to unlock the mobile device. For this purpose, the mobile device displays a numeric keypad and a user performs authentication by entering a sequence of numbers or by making an unlock gesture.

In the method according to the invention, however, the signal is not based exclusively on the performance of the input sequence, but is rather significantly co-determined by the presence of the electrically conductive structure.

To this end, it is preferred that the input means interacts with the electrically conductive structure on the area sensor while the input sequence is performed. This means that the input means comes into effective contact with different areas of the electrically conductive structure during the input sequence. That is, the input means at least temporarily covers electrically conductive areas, such that a resulting signal on the area sensor depends on both the positioning of the input means and the design of the electrically conductive structure.

For the purpose of the invention, the input means are preferably fingers or special input pens, for example styluses. The input means are preferably capable of changing a capacitive coupling between row and column electrodes within the area sensor. Preferably, the input means are designed such that they can trigger a touch event on a capacitive touchscreen. Particularly, since touchscreens are optimized for human finger input, any input means that mimic the shape, size, and/or capacitive interactions between a finger and an area sensor may be preferred.

The electrically conductive structure may, for example, comprise several single elements which are present on the device below a visually marked keyboard, wherein the single elements differ in shape, size, and/or eccentricity (see FIGS. 5 and 6). When an input sequence is performed on the device or visualized keyboard, the signal generated will not correspond exclusively to a typing sequence (for example, a numeric or letter code). Instead, the detected signal will for each typed input be based on a combination of the position of the input means and the design of the individualized single element. In other words, the position of the input means detected by the area sensor is characteristically deflected or modulated by the single elements.

Each combination of a given electrically conductive structure (=first authentication factor) and an input sequence performed thereon (=second authentication factor) can thus be assigned a unique signal. The authentication is successful only if a detected signal was generated with sufficient likelihood by the correct combination of both factors.

For this purpose, the signal detected by the area sensor is preferably compared with reference data as part of the evaluation. The term reference data preferably refers to any data that allows an indication of the likelihood with which a detected signal was generated by a combination of the correct first and second authentication factors. For example, it may be preferred that the reference data comprises calibration data comprising a correct combination of the two authentication factors.

Similarly, it may be preferred that the reference data comprises calibration data of a plurality of input sequences to a respective electrically conductive structure, wherein each set of calibration data can be associated with the underlying input sequence. For example, with respect to the above example of input on a keyboard, it may be preferred that the reference data for each possible sequence of numbers includes data about the signals thereby generated on an area sensor.

Preferably, authentication is successful provided that the detected signal is generated with high probability by a combination of the correct first and second authentication factors, while authentication is unsuccessful provided that the detected signal is not generated with high probability by a combination of the correct first and second authentication factors. High probability can for example be 90%, 95%, 99% or more.

In addition to data identifying an expected signal for a correct combination of authentication factors, the reference data can therefore also include, for example, tolerances or threshold values that define a degree of deviation of the detected signal from the expected signal that is permissible for authentication. A person skilled in the art understands that the choice of an allowable degree of deviation affects the required probability of a match. The narrower the tolerances are chosen, the higher the probability must be that the detected signal matches the expected signal. The choice of tolerances can preferably be selected depending on various factors, such as the detection accuracy of the area sensor, manufacturing tolerances for the electrically conductive structure, as well as expected tolerances when performing an input sequence (for example, based on the key size) and/or security requirements of the application.

The reference data can be stored, for example, on an electrical device that includes the area sensor. It may also be preferable for the reference data to be available on a server, on the Internet, and/or in a cloud.

For the purposes of the invention, "authentication" is preferably to be understood in its broadest form and may refer to any method for granting an action or access based on the provision of the two authentication factors. The meaning of the term authentication preferably also covers identification or verification procedures which are also based on the provision of the two authentication factors.

Preferably, the authentication method may authenticate one or more users and then authorize an action and/or access for those users on the area sensor or a device comprising the area sensor. Preferably, the first authentication factor or identification code is represented by the arrangement of the electrically conductive structure on the capacitive information carrier. The second authentication factor or identification code corresponds to the information for performing an input sequence. An action or access is granted after successful completion of the authentication, i.e., particularly, when it is determined with sufficient likelihood that the detected signal is based on a combination of the first and second authentication factors. Otherwise, authentication is unsuccessful and the action or access is not granted.

For example, the method can be used to authenticate a user for access to secure information or to perform subsequent actions such as authorizing monetary transactions or controlling devices. The process is characterized by a very high degree of security. Nevertheless, it is advantageous that the method is not limited to the authentication of a user, in contrast to, for example, biometric authentication methods, which involve the recognition of fingerprints. Instead, it can serve as an authentication method for multiple authorized users insofar as they have the first authentication factor in the form of the device or capacitive information carrier and the second authentication factor in the form of secret knowledge or information.

The method according to the invention can be used to implement a wide range of application examples.

A non-exhaustive selection includes, for example, a use of the device in the method as credit cards or bank cards, e.g. for entering CCV code, PIN code, TANs, etc. in online banking, mobile banking, etc., banknotes, for example embedded in windows (transparent areas in banknotes) or in combination with hologram strips, security strips, security threads, holograms, or other security features, voucher cards, prepaid cards, lottery tickets, lotteries, generally as verification keys with an adjustable security level, as key or access control to digital content, for authentication of games, card games, education applications, learning games, interactive applications, as personal identification cards (e.g. ID card, passport) for identity verification and e.g. to enable access to individual information (e.g. eGovernment applications), or as access cards, employee ID cards and for access to machines or control of authorizations for machine operation.

Preferably, this is a method for multi-factor authentication by means of a device on a capacitive area sensor, preferably a touchscreen, wherein the device in the sense of multi-factor authentication is a secret-protecting object that must be in the possession of the user at the time of authentication. This physical object, for example in the form of a card, contains an electrically conductive structure arranged on the object or integrated in the object. The secret-keeping object can also synonymously be referred to as a token.

In addition, the invention provides a piece of secret information, for example in the form of a personal identification number (PIN), an unlock gesture or pattern, or in the form of a specific user input, as a second factor for authentication. On the one hand, the secret information can be knowledge of the user, for example, a sequence of numbers or PIN, an unlock gesture, an unlock pattern, or other input. On the other hand, the secret information can be specified by the system during authentication, e.g., in the form of a TAN or by a visual or acoustic specification of the mobile terminal during authentication.

If the user performs an input using the physical object, a set of so-called touch events is generated on the area sensor, preferably touchscreen, of the mobile terminal, which set is evaluated by software. The signal or signal progression comprising the set of touch events is determined by the electrically conductive structure in the physical object as well as the input by the user.

Software can preferentially compare the signal with an expected value or expected signal and decides on successful authentication. Authentication is successful only if the physical object having a certain electrically conductive structure and the user input are correct in combination and match the expected value or an expectable signal.

In addition to the advantages already explained, the method according to the invention is characterized by a number of further advantageous features.

This allows the provision of a significant amount of variation in input sequences. As shown below with reference to the various embodiments, the amount of variation may be defined, for example, by the number of visually marked input areas. In this way, a different number of keys or input areas can be defined in strip form, with which the set of potential input sequences can be adjusted to the respective security requirements.

Furthermore, the concept according to the invention allows flexible adjustment of the electrically conductive structure to a desired format of the device or physical object. The production of the physical object or device is preferred in large quantities and can be realized at extremely low prices using printing processes. Classical methods for manufacturing electronics are not required. Instead, the method is suitable for high-volume use and can thus enable the highest security requirements for applications in a wide variety of fields.

In addition, inputs, for example in the form of an unlock gesture, an unlock pattern, and/or a combination of letters or numbers can be individually selectable or dynamically specified by the device. The input sequences can thus be presented intuitively and comprehensibly for the user and also supported by interactive aids. Also, the readout reliability can be increased by circulating or repeated inputs. The method is thus more robust and fault-tolerant to operator errors and can be made secure by individually defined requirements regarding the frequency or scope of the input sequences.

In a preferred embodiment of the invention, the device comprises a capacitive touchscreen, wherein the device processes the signal as a set of touch events.

A touch event preferably refers to a software event provided by the operating system of the device with the capacitive area sensor when an electronic parameter detected by the touch controller changes. As explained above, commercially available mobile devices preferably include a touch controller that detects the performance of an input sequence on the device as a set of touch events and can provide it to the operating system of the device.

The authentication method according to the invention can advantageously build on the existing technology and use it for further processing instead of the touch events provided. The touch events can be used in a particularly fast and efficient way with respect to further evaluation and, for example, a comparison to reference data.

In preferred embodiments of the method, the set of touch events or touches is processed and evaluated using a software program ('app'). The evaluation may include several steps. Preferably, the device parameters of the device which includes the area sensor, e.g. the resolution of the touchscreen, are determined first. Depending on the device, the signal comprising a set of touch events is preferably pre-filtered in the next step, and specific characteristics of the signal are amplified or adjusted. The signal is then checked for plausibility by calculating parameters such as the time profile of the signal, velocity and data density, checking them for any tampering and comparing them to known threshold values.

It is preferred that various characteristics and parameters of the signal are then determined or calculated, for example, coordinate positions of the touches or local velocities, deflections or amplitudes of the set of touches and possibly other characteristics in order to convert the signal into a data set which can be compared to reference data.

The characteristic values or parameters can preferably be selected in dependence on a signal that can be expected for a correct input sequence. For example, if a typing sequence is provided on a keyboard, it may be preferred to determine the coordinate position of the generated touch starts. In the case of sweeping motions as an input sequence, it may be preferable to quantify the dynamics of the individual sweeping motion and, if necessary, its deflection by single elements of the electrically conductive structure.

In a preferred embodiment, the device is a card-shaped object. For the purpose of the invention, a card-shaped object is preferably understood to be an object having a flat shape. That is, the card-shaped object preferably has a height that is significantly less than a length or width of the object. For example, the ratio of height to length or width may preferably be greater than 1:10, 1:50, preferably 1:100 or more. The card-like object preferably includes opposing base and top surfaces, which are significantly larger than the side surfaces due to the low height of the latter.

The electrically conductive structure is preferably present within the surface of the card-like object, wherein the device is preferably placed with a base or bottom surface onto an area sensor while an input sequence is performed on a top or upper surface.

In some embodiments, it may be preferred that the card-shaped object has a length that is greater than the width of the object. For example, this may mean objects having a length-to-width ratio greater than 1.5. For example, a common credit card has a length of 85.6 mm and a width of 54 mm, which corresponds to a ratio of about 1.6. A conventional credit card thus represents an example of a card-shaped object wherein a length is greater than a width of the object. Similarly, it may be preferred that the card-shaped object has a substantially square base, preferably characterized by a ratio between the length and width of the object of about 1.

In a preferred embodiment of the invention, the input sequence is a swipe gesture, an unlock gesture, and/or a sequential input of a sequence of numbers, letters, or symbols. The sequential input of a sequence of numbers, letters, or symbols can preferably be a sequence of typed inputs (typing sequence) or a sequence of sweeping motions. Preferably, the input sequence is performed while the device is placed on the area sensor and is based on visual markings on the device.

In a preferred embodiment of the invention, the device has visually marked input areas for performing a plurality of input sequences. The visually marked input areas are preferably areas of the device which are understood by a user as guidance for performing an input sequence. A visual marking can be characterized, for example, by a color distinction from the top surface of the device. Borders as markings in the form of lines as well as lettering etc. are also possible.

For example, these can be visually marked keys of a keypad. However, input areas in the form of arrows, strips or the like can also be marked on the device. In the case of a card-like shape of the device, the visually marked areas are preferably present at least on a cover surface or a top surface, which is accessible or visible or facing upwards when the device is placed on an area sensor. However, it may also be preferable to provide both the top and bottom of a card-shaped object with respective visually marked input areas.

The visual input areas preferentially span a discrete space of sequential options for single inputs. In case of a visually marked keyboard, there is one option per single input or typing input according to the number of keys. The total number of input sequences made possible by the visual input areas is preferably equal to the number of options per single input or typing input multiplied by the number of single inputs, i.e. the length of the input sequence. In the case of a keyboard with 9 keys and an input sequence of length four, for example, 9*9*9*9=6561 input sequences are made possible.

If strip-shaped input areas which are marked by digits at the respective ends are provided, for example, the option per individual input or sweeping motion corresponds to twice the number of strip-shaped input areas, since in each case a sweeping motion to the upper or lower digit has a different orientation. Thus, for an input sequence of length three, 10*10*10=1000 input sequences are made possible.

A provision of input regions for making a plurality of input sequences preferably comprises a provision for performing a plurality of individual inputs, for example 2, 3, 4, 5, 6, 7, 8, 9, 10 or more, which as a sequence of n individual inputs result in a plurality of possible input sequences, for example $2^n$, $3^n$, $4^n$, $5^n$, $6^n$, $7^n$, $7^n$, $8^n$, $9^n$, $10^n$ or more. The number n of individual inputs corresponds, for example, to the number of intended sweeping motions or typing inputs and can preferably be 2, 3, 4, 5, 6, or more.

Authentication is successful only if the one correct input sequence (=second authentication factor) is performed. The security therefore scales with the number of input sequences that are possible in principle. Advantageously, this can be influenced by the design of the visual input areas and thus flexibly be adjusted to the application. For especially high-security applications, such as online banking, it will be preferable to provide a high number of input sequences, for example, 1000 or more. For other applications, for example as access to less security-relevant online services, a lower number of input sequences can be provided, for example, between 100 and 1000.

There are several preferred design options for the visual input areas.

In a preferred embodiment, the visually marked input areas are arranged as a keypad, the keys of which are marked by numbers, letters and/or symbols.

In a preferred embodiment, the input sequence may correspond to a sequence of typing inputs of a sequence of numbers, letters, and/or symbols on the keypad.

In a preferred embodiment, the input sequence may correspond to a swipe gesture and/or unlock gesture over the keypad.

The terms unlock gesture or swipe gesture can preferably be used interchangeably and preferably refer to a continuous movement of the input means on the area sensor, particularly preferably between discrete positions. In the case of a visually marked keyboard, the unlock gesture preferably corresponds to a continuous movement of the input means from a first key to other keys to the last key according to a sequence of numbers, letters or symbols.

In a typing sequence, a single input preferably corresponds to a typing input, wherein an input sequence comprises multiple sequential typing inputs. In the case of an unlock gesture or a swipe gesture, a single input preferably corresponds to a sweeping motion between two positions which are marked by visual numbers, letters or symbols, for example.

In another preferred embodiment, the visually marked input areas are arranged as strip-shaped areas with numbers, letters, and/or symbols marked at their respective ends. The numbers, letters and/or symbols may be present at one end only or at both opposite ends.

In a preferred embodiment, the input sequence may correspond to a sweeping motion over the respective strip-shaped areas, wherein preferably the direction of the sweeping motion depends on the numbers, letters and/or symbols arranged at the ends. For example, numbers may be present on one or both sides of each strip-shaped area. If a number sequence is specified as the second authentication factor, the input sequence would preferably correspond to a sequential execution of the sweeping motions for the respective digit of the number sequence.

The generation of a tamper-proof signal is preferably based on the combination of performing a (correct) input sequence on the visually marked input areas with the underlying electrically conductive structure.

In a preferred embodiment, the device comprises visually marked input areas for performing the input sequences, and the electrically conductive structure comprises multiple single elements, wherein the single elements overlap with one or several of the visually marked input areas, such that the signal detected by the area sensor is deflected when an input is performed using an input means on one of the visually marked input areas.

Preferably, the individual areas or single elements of the electrically conductive structure are thus arranged in correlation to the visually marked input areas, such that the area sensor does not detect a signal that corresponds exclusively to the performance of the input sequence by means of the input means (for example, a typing sequence or a sweeping motion), but undergoes a characteristic deflection corresponding to the first authentication factor in the form of the electrically conductive structure. Overlapping preferably means that the conductive single elements are at least partially present below the marked input areas. This means that when an input is made via the input area, the input means will come into operative contact with the single elements at least at one point in time. Operative contact preferably means capacitive interaction. For the purposes of the invention, the term operative contact is preferably to be understood as meaning that said objects, for example the electrically conductive structure and the input means, together have an effect on the area sensor. This is preferably to be understood in the sense that changes occur in the electrostatic field formed between the transmitting and reading electrodes of the electrode grid of the area sensor, such that a signal is detected, for example in the form of touch events. The electrically conductive single elements do not have to be visible for this purpose, but should preferably not be capacitively shielded both against the top of the device (i.e., on the input side) and against the bottom of the device (i.e., on the detection side).

To ensure overlapping interaction between the electrically conductive structure and the input sequence, there are a variety of preferred designs, which are illustrated with reference to, but not limited to, the exemplary embodiments.

In preferred embodiments, the second authentication factor is known to the authorized user, so it is preferably secret knowledge in the sense of multi-factor authentication. Based on the knowledge of the secret information, a user—provided he or she is also in possession of the device or the capacitive information carrier—is able to perform the authentication. A user can also share the secret information with other authorized users.

However, it may also be preferred that the second authentication factor is provided to the user as secret information.

In another embodiment of the invention, the second authentication factor is transmitted to the device and/or is stored on the device, wherein preferably the device outputs the second authentication factor in the form of an optical prompting signal, an acoustic prompting signal, and/or in the form of a separate message for instructing an input sequence.

For the purpose of the invention, the prompting signals may also be referred to as instruction sequences or prompt sequences and may include, for example, sequential individual prompts to perform an input sequence.

For example, the prompting signals can be sent to the user's mobile device in the same way as a mobile TAN procedure. After receiving the prompting signal, the user can perform the input sequence on the device. On the one hand, for this embodiment of authentication, a user advantageously does not have to remember the secret information or store it on possibly insecure media (separate piece of paper, notes on the smartphone, etc.). On the other hand, in contrast to familiar mobile TAN procedures, two-factor authentication in online banking does not use the same transmission channel.

In analogy to known mobile TAN procedures, the second authentication factor is transmitted via the mobile device, for example a smartphone. However, the first authentication factor cannot be stored as login data on the device as in known mobile TAN methods, but is instead physically present in the form of the electrically conductive structure on the device.

The method can thus combine a high level of security with a high level of user-friendliness.

While prompting signals can be delivered in a variety of ways, visual prompts have been found to be particularly convenient and simple.

In another preferred embodiment of the invention, the device has recesses and/or transparent areas, such that when the device is placed onto the capacitive area sensor, preferably the touchscreen, optical prompting signals generated by the device are visible as instructions for performing an input sequence.

The recesses and/or transparent areas can preferably also serve as visually marked input areas. In preferred embodiments, the recesses and/or transparent areas may be referred to as control tracks or control buttons. The optical prompting signals are preferably generated by a touchscreen and are preferably visible to the user through the cutouts and/or transparent areas. If, for example, a control track lights up, the user is prompted to swipe over it in the specified direction. Likewise, when a button lights up, a user is given priority for input.

Thus, a variety of embodiments may be employed, both of the device and its use in authentication methods. Some particularly preferred variations are illustrated by means of preferred exemplary embodiments without being limited to them:

Exemplary Embodiment: Unlock Gesture

In one exemplary embodiment, the multi-factor authentication method includes as components the device or physical object, for example, a card with an electrically conductive structure, and the input of secret information, for example, a PIN number or an unlock gesture.

An electrically conductive structure is arranged on the physical object or, in the present case, on the card-like object. This electrically conductive structure can be visible to the user or hidden from the user in a suitable manner, for example by overprinting or laminating. For authentication, the card-like object is placed on the touchscreen of an electronic device, and a gesture is performed on the object with a finger or other input device, e.g., touch stylus, input pen, etc.

During the input, the gesture or the input path is temporarily preferably in operative contact with at least one or more elements of the electrically conductive structure. In other words, the input device or finger overlaps with elements of the electrically conductive structure at certain times during input. The gesture or input path is preferably determined by the user and corresponds to the secret information in the present invention. The time-dependent signal generated by the input is preferably deflected by the electrically conductive structure directly during the input. Thus, the resulting signal on the touchscreen is different from a fictitious reference signal, which the finger would have generated when performing the same gesture on a card without a conductive structure. A highly secure authentication can be performed based on a comparison of the detected signal to reference data.

Possible applications include entering a password through a carrier medium such as an ID card and/or payment card using an individually selected gesture. Here, it was particularly surprising for the purpose of the invention that such a gesture, as is known from unlocking smartphones, for example, can serve as an additional individual key in combination with a very inexpensively producible card-shaped object as a form of multi-factor authentication.

Exemplary Embodiment: Keypad or Keyboard

In one embodiment, it is preferred that the electrically conductive structure is present in the form of several different single elements. Each single element includes, for example, a basic circular shape at the center and an additional element associated therewith, for example, in the form of a line, a bar, a triangle, a wedge, or a "pie segment," without being limited thereto. The set of basic circular shapes without additional elements may be referred to as the reference structure for the purpose of the invention. Preferably, the electrically conductive structure itself is hidden, for example under a cover layer. For example, a graphic representing a keyboard in the form of a numeric keypad with the digits from 1-9 or a number of symbols or the like can be arranged on the cover layer.

The user places the physical device or card-like object on the touchscreen of an electronic device and types, for example, a PIN on the number pad of the card-like object. The input by the user is deflected by the interaction between the input means or finger and the electrically conductive structure. For the purpose of the invention, deflected preferably means that the touch events detected by the area sensor or touchscreen are deflected or shifted with respect to the detected position compared to an input without a card-shaped object or compared to an input on a card-shaped object which only has a reference structure and therefore does not cause any deflection of the signal.

The resulting signal on the area sensor in the form of individual touch inputs on the screen is essentially characterized by the position of the touch events. The shape of the electrically conductive structure directly influences the position of the recognized touch inputs on the touchscreen relative to the actual position of the input by a finger or input means.

The strength or intensity, direction, and speed of the elongation or deflection of the signal can be controlled by the shape of the electrically conductive structure. The inventors were able to show that, for example, circular ring segments or "pie segment-like" versions of the single elements cause stronger deflections than linear variants.

Furthermore, in another preferred embodiment, for example, the center points within the individual electrically conductive structures are punched out in a circular shape to display instructions on the capacitive touchscreen that the user recognizes in the area of these cutouts. Thus, the entry of secret information can be dynamically predefined by the system, for example, by flashing single areas one after the other and prompting the user to tap or touch the respective area.

Exemplary Embodiment: Interactive PIN/TAN

In another preferred embodiment, the entry can be made as a PIN or TAN on control tracks set up specifically for this purpose on the device. The control tracks are preferably strip-shaped visually marked input areas, wherein the visual marking is that an underlying touchscreen is visible.

The device or physical object may once again be, for example, a card or card-shaped object. Preferably, the card or physical object includes cutouts, punch-outs, holes, transparent areas that serve as control tracks. The number of control tracks can be set variably. Likewise, their shape is almost arbitrary. For example, strips, waves, or the like may be preferred. The position of the control tracks can also be flexibly selected and adjusted to the respective product design or card design. The screen of the electronic device can display or provide visual instructions or instructions for operating or performing gestures through the recesses, punch-outs, holes, or transparent areas in the physical object, or in these areas. For example, these may be animated instructions, e.g. in the form of a light strip, etc.

The instruction sequence of the software can be transmitted to the user in different ways. In addition to the above-mentioned display through the transparent areas of the card, it is also conceivable to display the instructions at other locations on the touch display (e.g. next to the card placed thereon), through acoustic instructions, or via alternative channels, e.g. as a separate message to the user (SMS, eMail, or the like)

Preferably, the control tracks can still be used or swept over in two directions.

In one example, 5 control tracks which are marked at the end with numbers and which can be swept in two directions of an upper or lower number, allow 10 different numbers or input variants or options to be displayed per sweeping motion.

When entering a 6-digit PIN/TAN, i.e. an input sequence of length 6, $10^6=1$ million different input variants are therefore possible.

Depending on the possible variants for the electrically conductive structure and for each individual recess or control track, a very high number of variants or codings can be made possible. For example, one of 6 different electrically conductive structures or their single elements can be arranged per recess or control track, i.e. for 5 control tracks with two directions each, there are a total of 60 variants for an individual input. When entering a 6-digit PIN/TAN, $60^6 > 46$ billion variants are therefore possible in this example.

In preferred embodiments, more than two directions are conceivable depending on the design of the control tracks. For example, it may be preferable to design control tracks in the form of a cross or star. This also allows, for example, four or more numbers, letters or symbols to be arranged at the ends to enable a targeted sweeping motion in accordance with specified information. Control tracks can be marked in the graphic design of the device, e.g. by specifying numbers or symbols, or can remain without marking or be located at the edge of the card.

In preferred embodiments, the number of queries can be varied by software, although it needs not be apparent to the user which of his inputs are actually used. Advantageously, a physical key or object or device thus offers infinite digital options for authentication.

For the exemplary embodiment of a TAN/PIN input, the flow of the process may be as follows:

Description of process flow:
a) Provision of a device comprising a capacitive area sensor, preferably a touchscreen, and software for evaluating the detected signals, preferably the touch data
b) Provision of a device with an electrically conductive structure
c) Placing the device onto a capacitive touchscreen TAN case (specification of the input sequence/gestures by the software):
i. Start of an instruction sequence by the software, which uses the transparent areas of the device to specify the operating direction, sequence, and number of entries (determined by the TAN), e.g. by displaying an animated, colored bar within the recess
ii. Input of the sequence of specified gestures, if necessary multiple repetition for additional security of the information entered PIN case (input of a secret key by the user):
i. Input of the sequence of specific gestures using the personally known PIN, e.g. a sequence of numbers/colors/gestures (the PIN determines the sequence/direction and the control track in which the input is made)

d) Evaluation of the touch data by the device comprising the touchscreen
e) Return of a result (authenticated or not)

Process Flow for the PIN Variant
Two factors:
1. Secret information is the PIN known only to the user
2. The card with an electrically conductive structure, which must be physically present for authentication By entering the PIN on the card, which is placed on the touchscreen, the gesture or PIN entry is changed/modified/encrypted by the electrically conductive structure and the combined signal from both factors is transmitted to a server for verification/decryption/authentication.

Process Flow for the TAN Variant
Two factors:
1. Secret information is the instruction transmitted by the app or server about which gesture to perform.
2. The card with an electrically conductive structure, which must be physically present for authentication This variant preferably corresponds to a one-time password (OTP) approach. This means that an instruction is transmitted by the system which is only valid for a limited time. For example, the instruction transmitted by the app or server may be to perform a swipe gesture along a specific control track in a specific direction. By entering the gesture on the card, which is placed on the touchscreen, the gesture is changed/modified/encrypted by the electrically conductive structure and the combined signal from both factors is transmitted to a server for verification/decoding/authentication. The loop pass can be repeated several times. With each additional gesture, the input becomes more secure in its entirety.

In another aspect, the invention relates to a device for performing a method for multi-factor authentication on a device with a capacitive area sensor, wherein the device comprises an electrically conductive structure on a non-conductive substrate and wherein the device is characterized in that the electrically conductive structure represents a first authentication factor and the device has visually marked input areas for performing a plurality of input sequences, an input sequence of which can represent a second authentication factor, such that, when placing the device onto the capacitive area sensor and performing the input sequence on the device using an input means, a signal detected during the input sequence by the area sensor can be evaluated and authentication can be performed based on a comparison to reference data in accordance with the likelihood with which the detected signal was generated by a combination of the first and second authentication factors.

A person skilled in the art sees that preferred embodiments and advantages disclosed with respect to the described method for the device can equally be transferred to the claimed device. Similarly, preferred embodiments of the device described below may preferably be used in the claimed method. It is therefore preferred, for example, that the device is a card-shaped object.

In a preferred embodiment of the device, the visually marked input areas are arranged as a keypad, the keys of which are marked by numbers, letters, and/or symbols. Particularly preferably, there can be 2 to 30, preferably 3 to 16, particularly preferably 9 keys. Intermediate values, such as 2, 3, 4, 5, 6, 7, 8, 9, 10, 11, 12, 13, 14, 15, 16, 17, 18, 19, 20, 21, 22, 23, 24, 25, 26, 27, 28, 29, or 30, or a combination thereof, may also be preferred. As described, the number of keys preferably corresponds to the number of times a single entry can be made, such that a higher number of keys leads to increased security. On the other hand, too many keys can become confusing for the user. The above numerical ranges have proven to be an excellent compromise.

The term keypad or keyboard can preferably be used synonymously and preferably corresponds to an arrangement of individual, discrete, visually marked input areas or input fields which can be visually distinguished from a background by color tone, shape, or border and thus preferably visually take on the form of keys.

For example, the keys can be rectangular, round, polygonal or square. Particularly preferably, the keys themselves are identically shaped or sized, although different markings, for example different numbers, letters or symbols, are preferably present or depicted in the interior of a key.

Preferably, the size of the buttons can be adjusted to the overall size of the device. For standard mobile devices, for example, the individual keys or input fields can have a characteristic extension, i.e. preferably a largest extension in cross-section, of 3 mm to 30 mm, preferably 5 mm to 20 mm. The keys are therefore preferably fields that are visually marked on the device for performing an input. The keys can therefore also be called virtual keys, input fields or the like. Functionally, these can be used as described in the case of an attached device, similarly to an on-screen keyboard for inputs, for example typing inputs or unlock gestures.

In another preferred embodiment, the visually marked input areas are arranged as strip-shaped areas with numbers, letters, and/or symbols marked at their respective ends for performing a sweeping motion. Preferably, there can be 2 to 20, preferably 3 to 15, particularly preferably 3 to 10 strip-shaped areas. Intermediate values, such as 2, 3, 4, 5, 6, 7, 8, 9, 10, 11, 12, 13, 14, 15, 16, 17, 18, 19, or 20, or a combination thereof, may also be preferred. As described, the number of strip-shaped areas preferably corresponds to the number of options for a single input, such that a higher number of strip-shaped areas leads to increased security. On the other hand, too many input areas can become confusing for the user. The above numerical ranges have proven to be an optimized compromise. The number of options of a single input can additionally be doubled by varying the direction of the single input.

The strip-shaped areas preferably have a greater length than width. For example, the strip-shaped areas may have a length to width ratio greater than 1.5, preferably greater than 2, 3, 4, 5.

In preferred embodiments, the length of the strip-shaped areas is 5 mm to 100 mm, preferably 20 mm to 80 mm, while the width of the strip-shaped areas is 1 mm to 40 mm, preferably 2 mm to 20 mm. The size of the strip-shaped areas can preferably be adjusted to the overall size of the device or the size of the touchscreen of the mobile terminal.

In a preferred embodiment of the device, the electrically conductive structure comprises multiple single elements, wherein the single elements overlap with one or several of the visually marked input areas, such that the signal detected by the area sensor is deflected when an input is performed using an input means on one of the visually marked input areas.

It is preferred for the purpose of the invention that the electrically conductive structure comprises at least two single elements. However, it may be preferred for some applications of the invention that the electrically conductive structure comprises a larger number of single elements. In a preferred embodiment, the electrically conductive structure comprises a plurality of single elements arranged on the device, preferably a card-like object. For example, it may be preferred that the device has 2, 3, 4, 5, 6, 7, 8, 9 or more single elements and 100, 50, 40, 30, 20, 10 or fewer single elements. Particularly preferably, the device comprises 3 to 50, preferably 3 to 20, particularly preferably 3 to 10 single elements.

It may be preferred for the purpose of the invention that the single elements forming the electrically conductive structure are similar to each other, that is, for example, consist of strips of different length and/or width which may be arranged parallel or orthogonal to each other and, for example, have a same or different spacing from each other. It may be preferable to use single elements that are similar to each other in that all single elements are strip-shaped.

Even if they are similar in width, for example, they may differ in length. For example, different lengths lead to different deflection amplitudes, which are detected as a characteristic signal (see FIGS. 1b-d).

Likewise, the single elements may have, for example, a similar basic circular shape or central area, as well as one or more additional elements or peripheral areas pointing radially outward, for example in the form of a line, a bar, a triangle, a wedge or a "pie segment." A different number and/or orientation of the peripheral areas provides a characteristic deflection of the signal in the direction of the elements (see FIGS. 5a-b). However, it may also be preferred that the single elements of an electrically conductive structure are not similar to one another, i.e. have different shapes.

In another preferred embodiment of the invention, the single elements of the electrically conductive structure are electrically isolated from one another. The preferred spatial and/or galvanic separation of the single elements of the electrically conductive structure from one another can be achieved, for example, by having two single elements spaced apart from one another in each case, wherein this spacing between the single elements within an electrically conductive structure can be the same or can vary. It is particularly preferred for the purpose of the invention that the electrically conductive structure comprises at least two single elements galvanically isolated from each other, wherein the single elements are arranged in one plane. For the purpose of the invention, the term "in one plane" preferably means that the electrically conductive structure is present, for example, on the front side and/or the rear side and/or on a middle layer or inner layer of the preferably flat card-like object.

In a preferred embodiment of the invention, the single elements of the electrically conductive structure have a width of 0.1 mm to 20 mm, preferably 0.5 mm to 8 mm, more preferably 0.5 mm to 6 mm, most preferably 1 to 3 mm. It is most preferred for the purpose of the invention to use electrically conductive structures having a width of no more than 6 mm, for example, electrically conductive structures having a preferred width of 0.1 to 6 mm, although all values between 0.1 and 6 mm may be preferred. Particularly, intermediate ranges may also be preferred, such as 0.1 to 0.5 mm, 1 to 2 mm, 2 mm to 3 mm, 3 mm to 4 mm, 4 mm to 5 mm, or even 5 mm to 6 mm, as well as combinations of the aforementioned ranges, such as 0.5 mm to 2 mm or even 1 mm to 4 mm.

In a preferred embodiment, the single elements are preferably strip-shaped or line-shaped. The length of the single elements can preferably be varied over a wider range. Decisive boundary conditions are, for example, the contact surface of the device on the capacitive area sensor as well as the size of the capacitive area sensor. In a preferred embodiment, the length of the structural elements is at least 5 mm. In some embodiments, it is less than 60 mm, preferably less than 40 mm.

In a preferred embodiment of the invention, the visually marked input areas are strip-shaped input areas, the ends of which are marked with numbers, letters, and/or symbols, and wherein the electrically conductive structure comprises multiple line-shaped single elements and each strip-shaped area overlaps with at least one line-shaped single element, wherein preferably the line-shaped single elements are arranged orthogonally to the input areas and have different lengths.

By choosing different lengths of the line-shaped single elements, for example in relation to performing an orthogonal sweeping motion, the deflections of the signal conveyed by the input means turn out to be of different strengths. The signal detected during a sweeping motion can be understood as a time-dependent signal, which is modulated or deflected depending on the position of a single element below it. Both the positioning (local occurrence of the deflection) and the length of the line-shaped elements (amplitude of the deflection) can be used for coding. FIGS. 1, 3 and 4 show exemplary embodiments and the time-dependent characteristic signals obtained.

The device or the card-like object preferably rests on the area sensor, such that the movement of the user's finger makes the single elements of the electrically conductive structure that the user touches "visible" to the area sensor by activating them. The inventors have recognized that, by using a card-like object comprising an electrically conductive structure, an input on an area sensor can be changed compared to a reference input. This change is preferably called modulation in accordance with the invention.

It is preferably performed by activating the single elements of the electrically conductive structure by touching the input means, allowing the area sensor to detect them, wherein the resulting time-dependent signal is spatially distorted by the arrangement of the single elements on the card-like object, for example, compared to a reference input or reference input sequence.

For example, if a sweeping motion of an input means is performed along a strip-shaped input area on the card-like object without electrically conductive structures, then the area sensor would detect a straight line motion of the input means as a reference input. However, if a card-like object is now present between the input means and the area sensor, on which object one or more single elements of the electrically conductive structure are arranged perpendicular to the strip-shaped area, partially overlapping with it but projecting to the left or right, the area sensor will detect a resulting signal that is deflected or modulated to the left or right relative to the reference input when an input means is moved on the card-like object. The deflection of the signal preferably occurs at a time when the respective single elements of the electrically conductive structure and the input means are in interaction with a same row and/or a same column of an electrode grid of the capacitive area sensor.

Such a time-dependent signal, generated particularly during a sweeping motion in the context of the present invention, preferably corresponds to the detection of a relative movement between input means and card-like object after deflection, distortion, and/or modulation by the electrically conductive structure.

The signal is time-dependent because there is a movement s(t), so the detected signal is also time-dependent in that it preferably represents a function of time. For the purpose of the invention, this preferably means that the time-dependent signal corresponds to the time sequence of the movement of the input means on the card-like object, wherein the detected positions of the resulting time-dependent signal, which are characterized particularly by the x and y coordinates of the touches, may be deflected, distorted, and/or shifted by the electrically conductive structure compared to a reference signal generated without a card-like object.

In a specific example, the input means is moved along an imaginary straight line in the y-direction at a uniform speed on the card-like object. As long as the input means does not come into contact with electrically conductive single elements, the resulting time-dependent signal is essentially characterized by touches that differ essentially by the time stamp and the respective y-coordinate, wherein the speed of movement is essentially constant. If the input means reaches an electrically conductive single element, at this time the position of the resulting signal is preferably deflected in the direction of the single element, i.e. the individual touch is shifted with respect to the x coordinate or deflected in the x direction compared to the previous touches.

In addition, the parameters of the individual touches of the resulting time-dependent signal can be used to calculate velocity profiles that can be used as characteristic data. In a specific example, the input means is moved along an imaginary straight line in the y-direction at a uniform speed on the card-like object. As long as the input means does not come into contact with electrically conductive single elements, the resulting time-dependent signal is essentially characterized by touches that differ essentially by the time stamp and the respective y-coordinate, wherein the speed of movement is essentially constant. If the input means reaches an electrically conductive single element, at this point the position of the individual touch is preferably shifted significantly more with respect to the y coordinate compared to the previous touches. It is preferred for the purpose of the invention that fluctuations in the velocity profile can particularly be detected when the input means comes into contact with electrically conductive single elements.

In another preferred embodiment of the invention, the device has a keypad with visually marked keys, wherein the electrically conductive structure comprises a plurality of single elements connecting a selection of keys.

For example, these can be linear single elements that connect one or more keys and can have different orientations. If an unlock gesture is made over the keypad, the direction of movement of the input means with different orientation will coincide with the respective line-shaped single elements. The modulation that takes place in the process is transferred into a tamper-proof signal as a combination of the unlock gesture and the authentication factor in the form of the arrangement of the single elements. FIG. 2 shows a respective exemplary embodiment.

In another preferred embodiment of the invention, the device has a keypad with visually marked keys, wherein the electrically conductive structure comprises a plurality of single elements arranged below the keys, and wherein among different keys there are single elements having different shapes, sizes and/or orientations.

In a preferred embodiment, the single elements have a circular basic shape or central area as well as one or more additional elements or peripheral areas pointing radially outward, such that when an input is made by means of an input means, a signal is detected on the central area which has undergone a deflection in the direction of the peripheral areas.

For example, the central region may have a diameter of 0.5 mm to 6 mm, preferably between 0.5 mm and 5 mm, particularly preferably between 1 mm and 4 mm. The peripheral areas may be conductive areas in the form of a line, bar, triangle, wedge, or circular ring segment or "pie segment" or the like. It is preferred that the peripheral areas and central areas are galvanically connected to each other, thus forming a coherent conductive area or single element.

In preferred embodiments, the various single elements having different shapes, sizes, and/or orientations below the respective buttons are single elements that have a substantially identical central circular region, but differ in the number and/or orientation of the peripheral regions. For example, it may be preferred that the peripheral regions have the shape of a circular ring segment. A circular ring preferably denotes an area between two concentric circles, i.e. between two circles with a common center. A circular ring segment preferably means a segment of such a circular ring, wherein the diameter of the inner circle preferably matches the diameter of the circular central area, such that a galvanic connection is present. In shape, the circular ring segments resemble "pie segments" and are therefore preferably also referred to as such (see FIG. 5 or 6). The shape of the pie segments or circular ring segment can be characterized by an opening angle and the outer diameter.

Preferred opening angles are between 10° and 90°, particularly preferably 30° and 60°, most preferably 45°. For example, the outer diameter may be greater by a factor of 2, 3, 4, 5 or more than the diameter of the inner circle or central area. Preferably, the outer diameter of the pie segments or circular ring segments can be, for example, between 4 mm and 30 mm, preferably 8 mm and 25 mm, and particularly preferably between 10 mm and 20 mm.

Depending on the orientation or alignment of the peripheral areas, which correspond to the polar angle in polar coordinates, for example, an input directed to the central area generates a deflected signal. The deflection of the signal will preferably be in the direction of the centroid of the one or more peripheral areas.

In particularly preferred embodiments, the electrically conductive structure does not comprise single elements or partial areas which are filled with conductive material in an area of more than 200 mm², preferably more than 160 mm², particularly preferably more than 120 mm². In prior art, for example, it was preferred to imitate the properties of fingertips in the form of so-called touch points in order to generate touch events. However, the inventors have recognized that for the intended signal overlay, performing an input sequence on a partially overlapping electrically conductive structure is not conducive to areas with a full area greater than 200 mm². On the one hand, touch events can otherwise already be triggered by partial areas of the structure or their single elements when they are placed on the area sensor. However, since the multi-factor method is intended to be a superposition of input and deflection by an underlying electrically conductive structure, input-independent touch events are not desired.

In addition, a characteristic deflection when performing an input over the single elements is more unpredictable in the case of relatively high areas or is subject to greater fluctuations and is therefore more difficult to detect. In contrast, the described electrically conductive structure with thin single elements is characterized by improved sensitivity or deflectability by the described input, e.g. by means of a finger.

In a particularly preferred embodiment, the single elements of the electrically conductive structure are designed in such a way that they cannot be detected when the device is just placed onto a capacitive area sensor, preferably a touchscreen. Individually and on their own, the single elements are instead preferably too small to be resolved and/or detected by the area sensor. Touch events are therefore not triggered by them.

These deliberately selected dimensions of the single elements advantageously ensure that the electrically conductive structure is set up in such a way that a signal which is influenced by both authentication factors can only be converted by means of an input sequence. This means that the signal of the input sequence is preferably modulated into such a combination signal by deliberately subjecting the signal to distortions or deflections, advantageously caused by the single elements of the conductive structure. The single elements of the electrically conductive structure are designed in such a way that a single element that is not in operative contact with an input means cannot be detected and/or recognized by an area sensor.

A particular advantage of the embodiment is therefore that an electrically conductive structure can be provided, the individual components of which, i.e. the single elements, do not generate a signal on the capacitive area sensor without operative contact to an input means, wherein the elements in their entirety as an electrically conductive structure are set up to cause a deflection of an input sequence on the area sensor, which permits multi-factor authentication. The generation of the signal, which is changed compared to a reference input of an input sequence without the presence of the capacitive information carrier, is advantageously formed by the synergistic interaction of the single elements with input sequences to be performed on the basis of the marked input areas.

The electrically conductive structure, preferably consisting essentially of a plurality of single elements, is preferably formed by electrically conductive areas on a non-electrically conductive substrate.

In a preferred embodiment of the invention, the substrate comprises an electrically non-conductive material, preferably a plastic, a paper, a cardboard, a composite, ceramic, textile, or a combination of the aforementioned materials. Particularly, the substrate is an electrically non-conductive material that is preferably flexible and lightweight. Translucent or opaque substrates can be used. Preferred plastics include particularly PVC, PETG, PV, PETX, PE, and synthetic papers.

In a preferred embodiment, the electrically conductive structure is formed by electrically conductive materials, preferably selected from a group consisting of electrically conductive inks, metal particles or nanoparticles, electrically conductive particles, particularly carbon black, graphite, graphene, ATO (antimony tin oxide), electrically conductive polymers, particularly PEDOT:PSS (poly(3,4-ethylenedioxythiophene), polystyrene sulfonate), PANI (polyaniline), ITO, EDot, salts, polyacetylene, polypyrrole, polythiophene, conductive fibers, and other conductive material types or coatings or a combination thereof.

Sheet resistance preferably refers to the electrical resistance of a material applied in a layer on a substrate. Typically, the electrical sheet resistance is abbreviated by $R_s$ and has the unit (ohm/square). Particularly preferred are electrically conductive layers with an electrical sheet resistance of less than 100,000 ohms/sq, preferably less than 10,000 ohms/sq or 1,000 ohms/sq.

In a preferred embodiment, the area coverage of the electrically conductive material in the area of the electrically conductive structure is 100%. It may also be preferred that the surface coverage of the electrically conductive material in the area of the electrically conductive structure is less than 100%, i.e. the electrically conductive structure is not completely filled with electrically conductive material. In this case, it is preferred that the single elements of the electrically conductive structure are surrounded by a closed contour line. Within the contour line, the single elements are filled, for example, with a grid, a grating, or an irregular filling pattern, which is designed in such a way that electrically conductive paths are formed within the respective single element. This variant may be preferred, for example, to save electrically conductive material. It is preferred that the surface coverage of the conductive material within the single elements of the electrically conductive structure is greater than 25%, more preferably greater than 40%, and most preferably greater than 60%.

In preferred embodiments, the electrically conductive structure may be applied to a preferably flexible substrate material of the card-like object by means of film transfer processes, for example cold film transfer, hot embossing and/or thermal transfer, without being limited to these application processes. Particularly, printing methods, such as offset printing, intaglio printing, flexographic printing, and/or screen printing, and/or inkjet methods using electrically conductive inks based on, for example, metal particles, nanoparticles, carbon, graphene, and/or electrically conductive polymers, without being limited to these printing methods and/or materials, can be used to produce the card-like object. It may also be preferred for the purpose of the invention to cover the electrically conductive structure by at least one other layer, which layer may be a paper- or film-based laminate material or at least one lacquer/paint layer. This layer can be optically transparent or opaque.

The structure of the device can be multilayer or single-layer. Preferably, production can be carried out by means of known printing and further processing methods, wherein a large number of combination options exist, particularly for providing cutouts or transparent areas (control tracks):

In a preferred embodiment, the device has a non-conductive, non-transparent substrate, with a conductive print for the electrically conductive structure, and an optional overprint or label, such that a card can be provided with or without optically marked areas for an operator track or graphic instructions.

In a preferred embodiment, the device has a transparent substrate, with a conductive print for the electrically conductive structure, and an overprint or label, where the control track can be left out of the design ("closed window" card).

In a preferred embodiment, the device has a non-transparent substrate, a punched-out control track, a transparent label, a conductive print for the electrically conductive structure, and an optional overprint or label, wherein the control track is formed by an unprinted area ("closed window" card).

In a preferred embodiment, the device has a transparent or non-transparent substrate, a conductive print for the electrically conductive structure, with control tracks punched out (card with an "open window or hole or recess").

There are also various options for manufacturing the electrically conductive structure to enable the provision of recesses, transparent areas, or control tracks in a simple manner.

In a preferred embodiment, a non-transparent conductive ink is printed on, i.e., a portion of the control track is obscured by conductive ink. Alternatively, the conductive paint can be covered by a top layer with a control track.

In a preferred embodiment, a transparent conductive paint is used, such that a control track remains translucent.

In a preferred embodiment, a fine pattern of non-transparent or transparent conductive ink is printed, such that the print appears semi-transparent or partially translucent/transparent.

In preferred embodiments of the invention, the electrically conductive structure is applied directly to the substrate material of the device, for example, directly to a card-shaped object. It is further equally preferred to apply the electrically conductive structure to a sticker or label material and to affix or adhere this sticker to a substrate.

One feature of classic conventional printing processes is the simple and fast reproduction of a motif by applying the motif to be printed to a printing plate, for example gravure cylinders or offset printing plates, and then reproducing it several times at high speed. Conventional printing processes are not suitable for producing individualized content, as printing form production represents a significant proportion of the total production costs. This means that only longer runs of a print product can be produced economically. In graphic printing, digital printing processes exist for the production of short runs and individualized products, with which individual content can be printed economically. These printing processes include, for example, electrophotography, laser printing, inkjet printing, or digital film transfer processes.

The devices can thus be manufactured flexibly, individually and cost-effectively by means of a mass production process.

It is also possible to produce individualized electrically conductive structures using process combinations of conventional printing processes and additive or subtractive processes.

Two possible manufacturing processes are outlined below.

Laser Ablation:

In the first step, an electrically conductive basic structure is applied to a substrate, for example a flexible substrate, by means of electrically conductive paint or by film transfer processes. For example, the basic structure consists of a set of single elements, such as rectangles. In a second process step, the electrically conductive single elements are galvanically separated from each other at specific points by means of laser ablation, i.e. the electrically conductive material is selectively removed at these points. This allows unique, i.e. individualized, structures to be produced efficiently. A surprising advantage of this manufacturing process is the good optical concealability of the electrically conductive structure. Even after overprinting or covering the electrically conductive structure by means of a laminate or label, the electrically conductive structure may still be visible to the human eye in backlight conditions. If the structure is distributed over the entire surface and separated only at certain points by a thin laser cut, this structure is much more difficult to see with the naked eye.

Accordingly, in another preferred embodiment, the invention relates to a device, preferably a card-like object, wherein the electrically conductive structure is produced in a multi-step process comprising the following steps:
  a) Application of an electrically conductive basic structure to a substrate by means of a film transfer process or electrically conductive paint,
  b) Selective removal of parts of the electrically conductive basic structure by means of laser, resulting in an electrically conductive structure with single elements that have spatially separated areas.

In another preferred embodiment, the invention relates to a card-like object, wherein the electrically conductive structure can be produced in a multi-step process, preferably wherein the multi-step process comprises the following steps:
  a) Providing an electrically conductive substrate material, for example, metal films or plates, metalized paper, and/or aluminum-coated foil,
  b) Selective removal of parts of the electrically conductive coating by means of laser, resulting in an electrically conductive structure with single elements that have spatially separated areas.

By laser preferably means that laser radiation is used to ablate electrically conductive material at selected locations on the previously applied electrically conductive base structure. As a result, interruptions are formed in the previously continuously electrically conductive single elements of the basic structure, which advantageously interrupt a galvanic connection between two subregions of a single element, whereby the length of a single element can be adjusted, for example. As a result, an electrically conductive structure with single elements can be created, wherein the single elements of the electrically conductive structure have spatially separated areas. It is preferred for the purpose of the invention that the substrate is flexible. It can, for example, be a plastic, cardboard and/or paper card that is so thin that it is flexible and can be processed, i.e. printed, particularly easily within a printing press. It is particularly preferred that a card-like object is in a preferred size range of a credit card, visit card, or check card.

Inkjet Printing:

Another option for the subsequent individualization of an electrically conductive structure is the subsequent application of electrically conductive bridges. In the first step, an electrically conductive basic structure is applied to a substrate, for example a flexible substrate, by means of electrically conductive paint or by film transfer processes. The basic structure preferably consists of several single elements, for example rectangles, which have interruptions at certain points. In a second process step, these interruptions are selectively printed using electrically conductive ink, and thus interconnected. This process can also be used to efficiently produce unique, i.e. individualized, electrically conductive structures.

Accordingly, in another preferred embodiment, the invention relates to a card-like object, wherein the electrically conductive structure is produced in a multi-step process comprising the following steps:
   a) Application of an electrically conductive basic structure to a substrate by means of a film transfer process or electrically conductive paint,
   b) Selective application of electrically conductive bridges and/or additional electrically conductive elements by means of inkjet printing with which electrically conductive ink is applied to the card-like object, thereby obtaining an electrically conductive structure with single elements.

In another aspect, the invention relates to a system for multi-factor authentication on a device having a capacitive area sensor comprising
   a. a device according to the invention or a preferred embodiment thereof
   b. a device with a capacitive area sensor,
wherein the device comprises an electrically conductive structure which represents a first authentication factor and the device has visually marked input areas for performing a plurality of input sequences, an input sequence of which can represent a second authentication factor, such that, when placing the device onto the capacitive area sensor and performing the input sequence on the device using an input means, a signal detected during the input sequence by the area sensor can be evaluated and authentication can be performed based on a comparison to reference data in accordance with the likelihood with which the detected signal was generated by a combination of the first and second authentication factors.

The system according to the invention is preferably set up to detect and evaluate the signal that is generated by performing the input sequence on the device at the area sensor in order to verify or authenticate the combination of applied electrically conductive structure (=first authentication factor) and input sequence (=second authentication factor).

In a preferred embodiment, the system comprises a data processing device which is adapted to evaluate the generated signal, wherein preferably a software ('app') is installed on the data processing device comprising commands for evaluation of a signal detected during an input sequence on the area sensor, for comparing the detected signal to reference data and for authenticating based on the likelihood with which the generated signal was generated by a combination of the first and second authentication factors. A person skilled in the art recognizes that the preferred embodiments or steps disclosed in connection with methods for evaluating the detected signal or comparing it to reference data is preferably performed by the software ('app') comprising respective commands.

In another preferred embodiment, the software is provided at least in part in the form of a cloud service or Internet service, wherein the device transmits the touch data or touch events over the Internet to an application in the cloud. Also in this case, a software ('app') is present on a data processing device comprising instructions for evaluating a signal detected during an input sequence on the area sensor, for comparing the detected signal to reference data, and for authenticating in response to whether the generated signal is producible by a combination of the first and second authentication factors. However, the software installed on the device's data processing device does not necessarily perform all computationally intensive steps independently on the device. Instead, data about the detected time-dependent signal or the quantity of touch events is transmitted to a software application in a cloud (with an external data processing device) for comparison to reference data and/or for determining characteristic data of the signal. In a preferred embodiment, the software for recording or capturing the touch data may also be the browser of the device.

The software as a cloud service, which preferably includes commands to compare the signal to reference data, processes the signal in the form of a set of touch events and sends the result back to the device comprising the area sensor or to a software or the browser installed on the device. The software on the device can preferably process the results and, for example, control their display.

In the following description of preferred features of the software, a person skilled in the art recognizes that these preferably apply equally to software that performs the steps entirely on the device and to software that has outsourced some (preferably computationally intensive) steps, such as a determination of characteristic values and their comparison to reference data, to an external data processing device of a cloud service. A person skilled in the art recognizes that the intended evaluation of the detected signal is to be understood as a unified concept, regardless of which steps of the algorithm are performed on the device itself or by an external data processing device on a cloud. In preferred embodiments, for example, characteristic values of the signal may also be determined by the software on the device and a comparison of the characteristic values to reference data may be outsourced by a cloud service.

For example, a preferred method for multi-factor authentication on a device with a capacitive area sensor, in which the evaluation is performed on a server rather than on the device itself, may include the following steps:
   a) providing a device comprising a capacitive area sensor
   b) providing a device with an electrically conductive structure on a non-conductive substrate, wherein the electrically conductive structure represents a first authentication factor
   c) placing the device onto the capacitive area sensor
   d) providing information for executing an input sequence on the device, wherein the information represents a second authentication factor
   e) performing an input sequence on the device using an input means
   f) transmitting the signal generated during the input sequence on the area sensor to a server
   g) evaluating the transmitted touch data and comparing it to reference data on the server, wherein authentication is performed depending on whether the generated signal can be generated by a combination of the first and second authentication factors.
   h) transmitting the authentication result from the server back to the client or the device comprising the capacitive touchscreen.

By means of the method, authentication can preferably be performed with a PIN entry, i.e. a personal identification number and identification sequence known only to the user.

For example, another preferred method for multi-factor authentication on a device with a capacitive area sensor, in which the evaluation is not performed on the device itself but on a server, may comprise the following steps:

a) providing a device comprising a capacitive area sensor
    b) providing a device with an electrically conductive structure on a non-conductive substrate, wherein the electrically conductive structure represents a first authentication factor
    c) placing the device onto the capacitive area sensor
    d) passing n loops
        i. providing (partial) information for the execution of an input in the form of at least one prompting signal on the device
        ii. performing an input sequence on the device using an input means
        iii. transmitting the signal generated during the input on the area sensor to a server
    wherein the set of all (partial) information represents a second authentication factor and the set of n inputs can be called an input sequence.
    e) Evaluating the transmitted touch data and comparing it to reference data on the server, wherein authentication is performed based on the likelihood with which the detected signal was generated by a combination of the first and second authentication factors.
    f) Transmitting the authentication result from the server back to the client or device comprising the capacitive area sensor By means of the method, authentication can preferably take place with a TAN entry, i.e. a transaction number or transaction input sequence that is only valid for one transaction. Such methods are also known as one-time passwords (OTP). The higher the number of loops, the safer the process. For example, the number n can be 2, 3, 4, 5, 6, 7, 8, 9, or more.

The device including the area sensor is preferably an electronic device that is able to further evaluate the information provided by the capacitive area sensor. The capacitive area sensor or device preferably has an active circuit, also called a touch controller, which allows evaluation of touch signals on the area sensor as described above. By means of the touch controller and an operating system provided on the electronic device, the overall time-dependent signal is preferably processed as a set of touch events.

A touch event preferably refers to a software event provided by the operating system of the device with the capacitive area sensor when an electronic parameter detected by the touch controller changes.

An operating system preferably refers to the software that communicates with the hardware of the device, particularly the capacitive area sensor or the touch controller, and enables other programs, such as software (an 'app') to run on the device. Examples of operating systems for devices with capacitive area sensors are Apple's iOS for iPhone, iPad and iPod Touch or Android for operating various smartphones, tablet computers or media players. Operating systems control and monitor the hardware of the device, especially the capacitive area sensor or a touch controller. Preferably, operating systems for the claimed system provide a set of touch events that reflect the detected signal.

In the case of a sweeping motion as an input sequence, this can be detected, for example, as a touch start, a touch move and touch end, wherein the time sequence of the sweeping motion can be traced using the x or y coordinates and the time stamps of the touches.

In the case of a touch input as an input sequence, this can be recognized, for example, as a touch start and touch end, wherein the position of the touch input as well as its temporal sequence can be traced in the context of the sequential input on the basis of the x or y coordinates and the time stamps of the touches.

Placing the device with an electrically conductive structure with structural elements preferably does not itself generate an independent signal on the area sensor. As described above, it is the input sequence, for example by means of a finger, that generates the detectable signal. In this case, however, the detected signal does not correspond to the signal that would be generated if the input sequence were performed on the area sensor without the presence of the conductive structure. Instead, the input means is preferably at least temporarily in operative contact with the electrically conductive structure. In other words, the input means or the finger overlaps with single elements or partial areas of the electrically conductive structure at certain points in time during the input sequence. The time-dependent signal generated by the input sequence is thus deflected or modulated during the input by the electrically conductive structure.

A highly secure authentication can be performed based on a comparison of the detected signal to reference data.

The detected signal is preferably processed as a set of touch events by the operating system or the touch controller of the electronic device, such as a smartphone.

The software ('app') installed on the data processing device preferably evaluates the signal based on the detected set of touch events.

The data processing device is preferably a unit which is suitable and configured to receive, send, store, and/or process data, preferably of touch events. The data processing unit preferably comprises an integrated circuit, a processor, a processor chip, microprocessor, and/or microcontroller for processing data, as well as a data memory, such as a hard disc, a random access memory (RAM), a read-only memory (ROM), or a flash memory for storing the data. Respective data processing devices are present in commercially available electronic devices with area sensors, such as the mobile terminals or smart devices.

The software ('app') can be written in any programming language or model-based development environment, such as C/C++, C#, Objective-C, Java, Basic/VisualBasic, or Kotlin. The computer code may include subroutines written in a proprietary computer language specific to reading or controlling or another hardware component of the device.

Particularly, the software preferably determines characteristic values of the signal (preferably in the form of a set of touch events) in order to compare them to reference data sets comprising, for example, characteristic reference data or threshold values.

The characteristic data are preferably dynamic characteristic data which quantify or characterize the detected signal during the performance of an input sequence.

The characteristic values can be, for example, start, end, movement, abort, the coordinates, i.e. position on the touchscreen, optionally information on diameter or other geometric properties, a time stamp of the respective touch events.

In the case of touch inputs, particularly, the coordinates of the generated touch events are recorded together with a time stamp. Compared to reference data for performing an input sequence without an electrically conductive structure or a reference structure which preferably does not deflect the input (for example, centered circular single elements under the keys or input fields), deflection or modulation can easily be quantified on the basis of coordination.

Also, characteristic data can be local velocities, local maxima, minima, local deflections, and/or amplitudes of a set of touch events. Especially in the case of sweeping motions over strip-shaped input areas, wherein the signal of the input means is deflected by single elements, the position, local velocities and local deflections or amplitudes, for example, can be recorded as characteristic data of the time-dependent signal.

The totality of the characteristic values characterizing the detected signal can preferably be summarized in a data set which can be compared to a reference data set in order to identify or verify the applied electrically conductive structure. In a preferred embodiment, the matching of the data set takes place using a machine learning model (artificial neural networks) previously created from recordings or calibration data. For example, reference data can be generated for this purpose by placing the device with an electrically conductive structure on the area sensor and performing a variety of different input sequences. For example, a reference data set can be generated for a specific electrically conductive structure (first authentication factor). Reference data sets for a reference structure (without desired deflection of the input signals) or for a plurality of possible electrical structures, which can represent a first authentication factor, are also conceivable.

As described above, the term reference data preferably refers to any data that allows an indication of the likelihood that a detected signal was generated by a combination of the correct first and second authentication factors. Preferably, the reference data may be stored on a computer-usable or computer-readable medium on the data processing unit. Any file format used in the industry can be suitable. The reference data can be stored in a separate file or database and/or integrated in the software (e.g. in the source code).

Due to the complexity of the detected signal as a combination of an input sequence and its modulation by an electrically conductive structure, such an assignment or verification is particularly secure and protected against manipulation.

Based on the determination of characteristic values, the software can also perform a series of plausibility checks to rule out any manipulation of the signal.

For example, it may be preferable for the software to compare the time profile of the input for a sweeping motion over vertical single elements and with reference data to check whether the deflections in the detected signal correlate with the velocity profile of the sweeping motion. As explained above, the deflection of the input preferably occurs at a time when the respective single elements of the electrically conductive structure and the input means are in interaction with a same row and/or a same column of an electrode grid of the capacitive area sensor. The time interval of the deflection as well as its duration should therefore correlate with the time profile of the sweep movement.

Also, the software can for example determine the amplitude and/or orientation of the deflection as the input means is swept and preferably compare it to reference data.

The determination of the characteristic values of the time-dependent signal and the comparison to threshold values and/or reference data sets thus preferably allows both a check of the plausibility of the signal and its assignment to reference data for authentication purposes. The evaluation by means of the software can be implemented in different ways and include several steps. Preferably, the device parameters of the device which includes the area sensor, e.g. the resolution of the area sensor or touchscreen, can be determined first.

The signal comprising a set of touch events can preferably be pre-filtered and specific characteristics of the signal can be amplified or adjusted. Advantageously, the software is thus not limited to a specific type of device, but can provide optimal results for different electronic devices.

After filtering the signal, the signal can be checked for plausibility by calculating parameters such as a time profile of the signal, velocity and data density. Based on a comparison to known or calibrated threshold values, any manipulation can thus be reliably excluded.

Particularly preferably, a number of diverse characteristic values and parameters of the signals are then determined or calculated. For this, among other things, the characteristic values for start, end, movement, termination, the coordinates, information on geometric properties, a time stamp, local velocities, local maxima, minima, local deflections and/or amplitudes of the touch events can be determined.

Particularly, the characteristic values should be suitable for comparing the input sequence as such as well as its deflection by the electrically conductive structure. Subsequently, the obtained data set and a reference data set, located for example in a database, can be compared to decode the signal, preferably using a machine learning algorithm. Decoding preferably means an assignment of the detected signal to a known combination of electrically conductive structure (=first authentication factor) and input sequence (=second authentication factor).

In another aspect, the invention relates to a kit for multi-factor authentication on a device having a capacitive area sensor comprising
  a. a device according to the invention or a preferred embodiment thereof
  b. a software ('app') for installation on the device, comprising commands for evaluating a signal generated during an input sequence on the area sensor for comparing the generated signal to reference data and for authentication based on the likelihood with which the detected signal was generated by a combination of the first and second authentication factors.

Optionally, the kit may further comprise instructions for installing the software on the device and/or for performing the described method, particularly for performing an exemplary input sequence with an input means on the device. In the case of a device having a keypad for a typing input, for example, the instructions may relate to performing an exemplary typing input, which may also illustrate, for example, the expected length of the input sequence. Preferably, the instructions allow a user to see in the case of knowledge of the correct second authentication factor, how successful authentication using the device on a device having a capacitive area sensor is feasible.

It is noted that advantages, features and details of the foregoing description as well as the following exemplary embodiments may each be preferred individually or in any combination to carry out the invention. Thus, the disclosure relating to the individual aspects of the invention can always be referred to reciprocally.

DESCRIPTION OF THE DRAWINGS

To complement the description that is being carried out, and in order to assist to a best understanding of the characteristics of the invention, attached to this specification, as an integral part thereof, there are drawings in which, with illustrative and no limiting nature, the following has been represented:

FIG. 1a shows an electrically conductive structure arranged on a non-conductive substrate, and FIGS. 1b-1d show an example of a method for mult-factor authentication on a smartphone in accordance with embodiments of the invention;

DETAILED DESCRIPTION

The invention will be explained in detail with reference to examples and figures below, without being restricted to these.

FIG. 1 shows a method for multi-factor authentication on a device (32) with a capacitive area sensor (30). The device (32) in the present example is a smartphone.

Figure 1A:
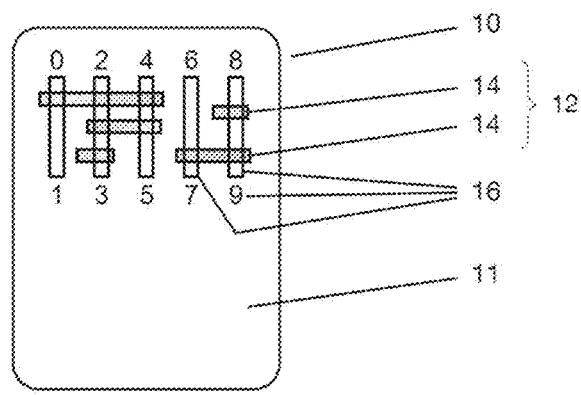
FIGS. 1a-1d show a method for multi-factor authentication on a device with a capacitive area sensor, where

FIG. 1a shows a device (10) comprising an electrically conductive structure (12) arranged on a non-conductive substrate. In the example shown, the device (10) is a card-shaped object. The electrically conductive structure (12) consists of multiple single elements (14). The electrically conductive structure (12) represents the first authentication factor. In addition, markings of the input areas (16) are arranged on the device (10). In the present exemplary embodiment, the visually marked input areas (16) are five vertically arranged, strip-shaped areas, each labeled with a number at the top and bottom. In the exemplary embodiment, the strip-shaped input areas (16) are preferably arranged orthogonally to the single elements (14) of the electrically conductive structure (12), which are also strip-shaped in this example. The visually marked input areas (16) at least partially overlap with the single elements (14) of the electrically conductive structure (12).

Figure 1B:
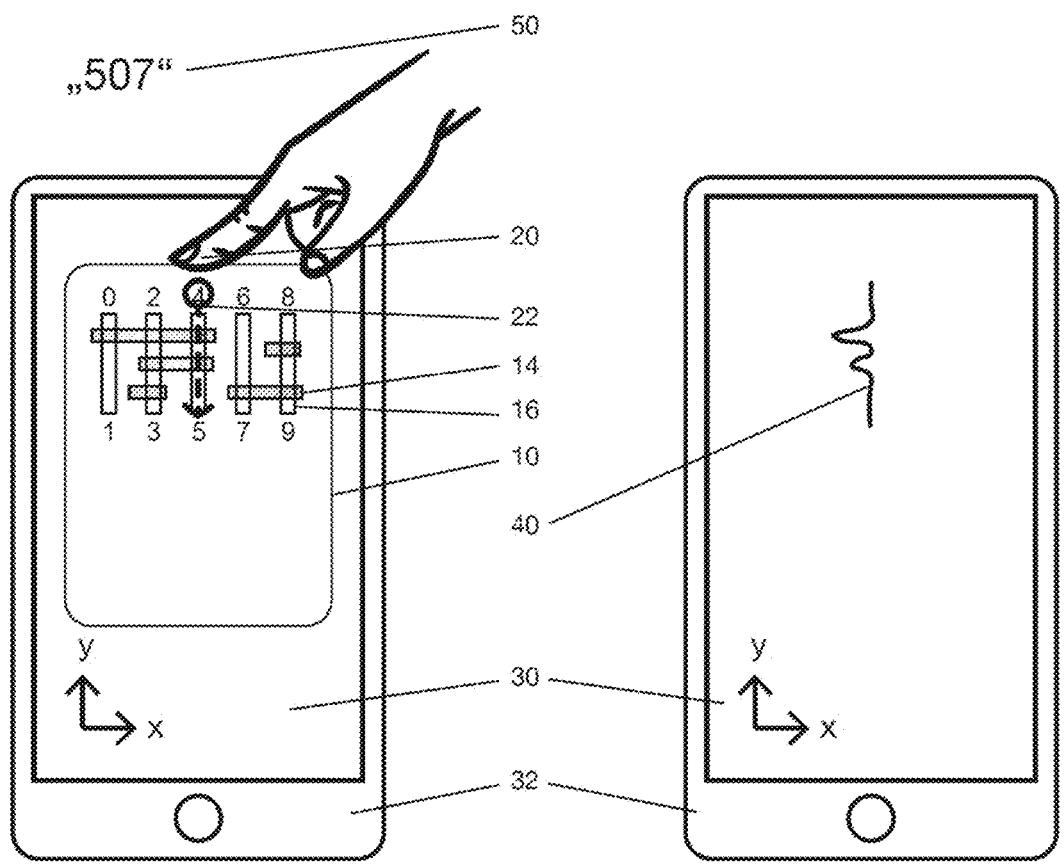
Figure 1C:
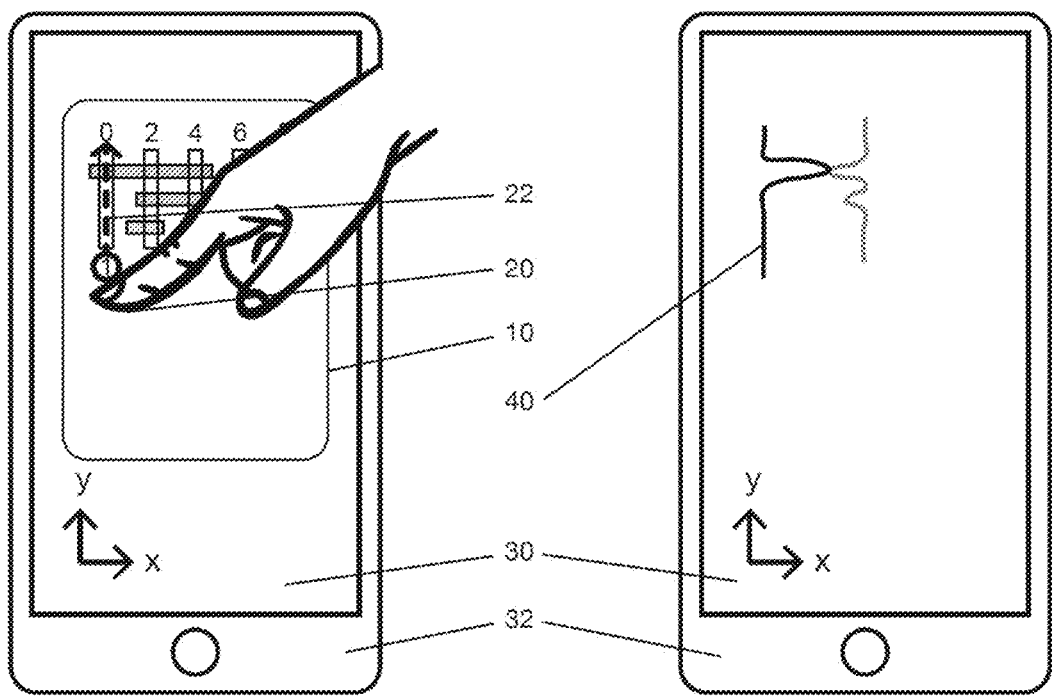
Figure 1D:
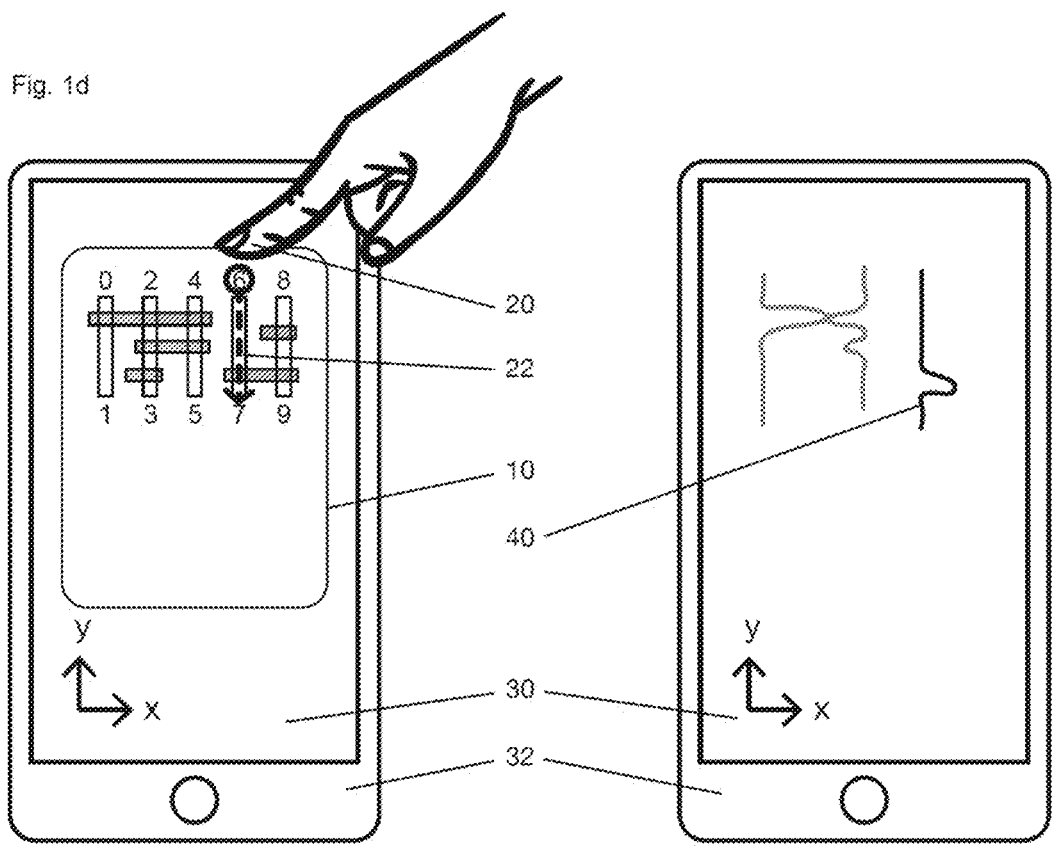

FIGS. 1b, 1c and 1d show an example of the method for multi-factor authentication on a device (32) with a capacitive area sensor (30) using the example of entering the sequence of digits "507." For the purpose of the invention, this sequence of digits chosen as an example is the information (50) representing the second authentication factor. The information (50) can be, a PIN known to the user or a TAN transmitted to the user, for example. The user places the device (10) in the form of a card-shaped object onto the capacitive touchscreen (30) and then enters an input sequence (24).

In the present embodiment, the input by the user is performed using an input means (20), e.g. with the aid of the finger, in the form of an input sequence (24) comprising several gestures or sweeping motions (22) along the marked input areas (16). To enter a specific digit, the user swipes his finger (20) along the marked input areas (16) to the respective digit of the information (50), i.e. in the present example in FIG. 1b on the middle input area (16) from top to bottom to the digit "five". The graph on the right shows the time-dependent signal (40) generated on the capacitive area sensor (30) during the execution of the gesture (22). For clarity, the time-dependent signal (40) is shown graphically as a progression, as if the signal (40) had been recorded comprising multiple individual touch events (44). The signal (40) is generated directly during the input (22). The input is in the form of a linear and essentially straight sweeping gesture (22), the course of which is shown by an arrow (dashed line) in FIG. 1b. The finger (20) or fingertip gradually comes into operative contact with single areas (14) of the electrically conductive structure (12). Thus, the resulting signal (40) on the capacitive area sensor (30) is not in the form of a straight line, as would be the case if the input were in the form of a linear and substantially straight sweeping gesture (22) without the presence of the electrically conductive structure (12) on the device (10), but the signal (40) is deflected by the interaction between the finger (20) and the electrically conductive structure (12). In the area of the upper as well as the middle conductive single element (14), the detected signal (40) exhibits deflections, the amplitude of which correlates with the length of the respective single element (14) of the electrically conductive structure (12).

FIG. 1c shows the input of the second digit of the information (50), "507." To enter the digit "zero," the user sweeps from bottom to top along the marked left input area (16) using input means (20). During the input in the form of a sweeping gesture (22), the time-dependent signal (40) is generated on the capacitive area sensor (30) of the device (32), as shown in the right part of FIG. 1c.

Input of the digit "seven" is performed in the same way as for the digits "five" and "zero" and is shown in FIG. 1d.

The set of gestures (22) performed, as shown in FIGS. 1b, 1c and 1d, corresponds to the input sequence (24), which in the present example represents the input of the information (50), "507." The right part of FIG. 1d shows the full signal (40) generated by the input of the input sequence (24) on the capacitive area sensor (30).

The generated time-dependent signal (40) is evaluated by the device (32) including the area sensor (30) and compared to reference data, and authentication is performed depending on whether the generated signal (40) can be generated by a combination of the first and second authentication factors, i.e., can be generated by a combination of the electrically conductive structure (12) and the input of the information (50).

Figure 2:
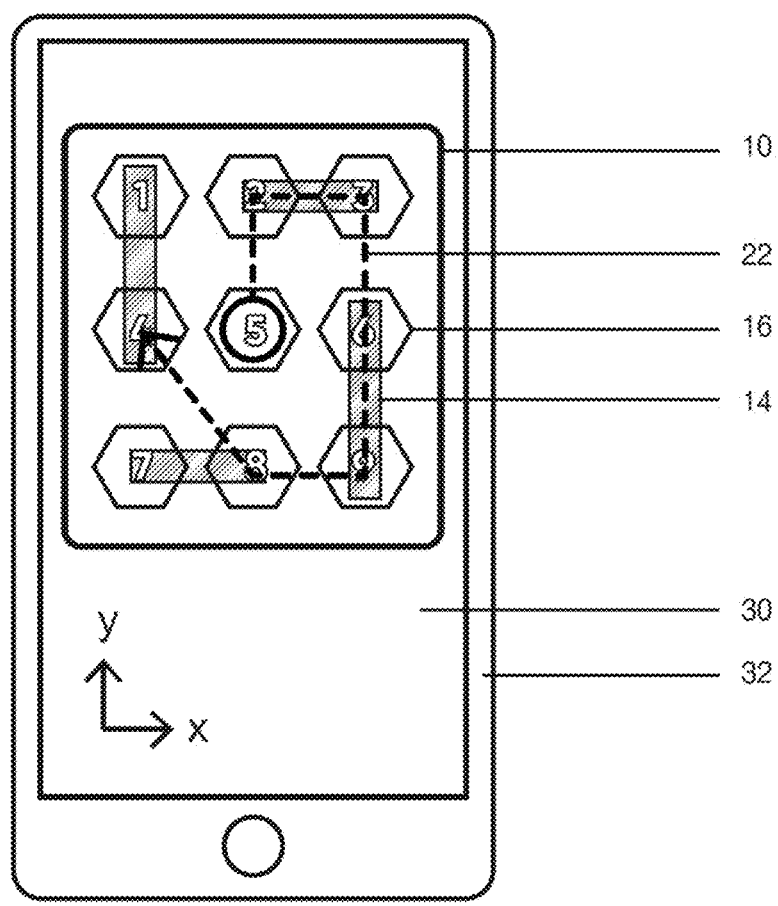
FIG. 2 shows an example of the procedure for multi-factor authentication on a device with a capacitive area sensor using the example of entering the sequence of digits "523984" in accordance with embodiments of the invention.

FIG. 2 shows a method for multi-factor authentication on a device (32) with a capacitive area sensor (30). The device (32) in the present example is a smartphone.

FIG. 2 shows a device (10) comprising an electrically conductive structure consisting of multiple single elements (14) arranged on a non-conductive substrate. In the example shown, the device (10) is a card-shaped object. The electrically conductive structure (12) represents the first authentication factor. In addition, markings of the input areas (16) are arranged on the device (10). In the present embodiment, the markings of the input areas (16) comprise nine fields or key fields, each labeled with a digit.

FIG. 2 shows an example of the procedure for multi-factor authentication on a device (32) with a capacitive area sensor (30) using the example of entering the sequence of digits "523984.". For the purpose of the invention, this sequence of digits chosen as an example is the information (50) representing the second authentication factor. The information (50) can be, for example, a PIN known to the user or an unlock gesture known to the user or a TAN transmitted to the user. The user places the device (10) in the form of a card-shaped object onto the capacitive touchscreen (30). Subsequently, a gesture (22) is entered with the aid of an input device (not shown). The input sequence is performed by using the input means (not shown) to successively connect the individual digits of the information (50), represented by the marked input areas (16), in the form of a sweeping or swipe gesture (22). To enter a sequence of digits, the user swipes his finger or an input pen (not shown) from one mark (16) to the next, i.e., in the present example, the user starts his input gesture (22) at digit "5" and gradually traces the path to digits "2", "3", "9", "8" and "4." In this example, the user does not interrupt his input (22), but performs the gesture "without stopping." The totality of the gesture (22) performed matches the input sequence, which in the present example represents the input of the information (50) "523984."

During the input (22) by the user, a time-dependent signal (not shown) is generated on the capacitive touchscreen (30). During the input in the form of the unlocking gesture (22) from digit to digit, the course of which is shown in FIG. 2 by an arrow (dashed line), the finger (20) or the fingertip gradually comes into operative contact with single areas (14) of the electrically conductive structure (12). Thus, the resulting signal (not shown) on the capacitive area sensor (30) does not have the shape of the input gesture as it would if the gesture were input without the presence of the electrically conductive structure (12) on the device (10), but the signal (not shown) is deflected by the interaction between the input means (not shown) and the single elements (14) of the electrically conductive structure.

The generated time-dependent signal (not shown) is evaluated by the device (32) including the area sensor (30) and compared to reference data, and authentication is performed depending on whether the generated signal (40) can be generated by a combination of the first and second authentication factors, i.e., can be generated by a combination of the electrically conductive structure (12) and the input of the information (50).

Figure 3:
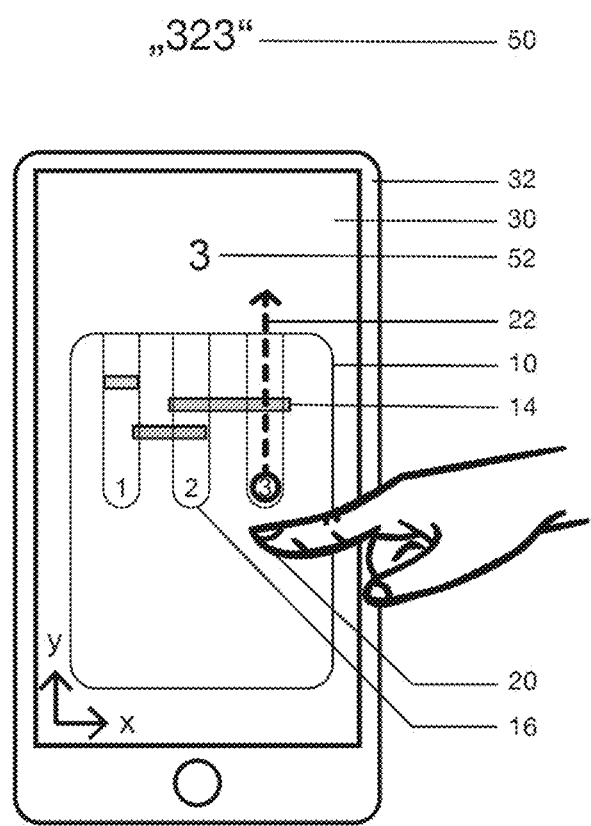
FIG. 3 shows an example of the procedure for multi-factor authentication on a device with a capacitive area sensor using the example of entering the digit "3" in a sequence of digits "323" in accordance with embodiments of the invention.

FIG. 3 shows a method for multi-factor authentication on a device (32) with a capacitive area sensor (30). The device (32) in the present example is a smartphone.

The device (10) includes an electrically conductive structure (not labeled for clarity) comprising multiple single elements (14) arranged on a non-conductive substrate. In the example shown, the device (10) is a card-shaped object. The electrically conductive structure (12) represents the first authentication factor. In addition, marked input areas (16) are arranged on the device (10). In the present embodiment, the marked input areas (16) comprise three vertically arranged, strip-shaped areas, each labeled with a number. In the exemplary embodiment, the strip-shaped input areas (16) are preferably arranged orthogonally to the single elements (14) of the electrically conductive structure, which are also strip-shaped in this example.

FIG. 3 shows an example of part of the method for multi-factor authentication on a device (32) with a capacitive area sensor (30) using the example of entering the digit "3" as part of the numerical sequence "323." For the purpose of the invention, this sequence of digits chosen as an example is the information (50) representing the second authentication factor. The user places the device (10) in the form of a card-shaped object onto the capacitive touchscreen (30) and then performs an input sequence (24). The information (50) is preferably transmitted to the user in the form of an instruction or prompting signal (52). This instruction (52) can be displayed graphically on the capacitive touchscreen (30) of the smartphone (32), for example, in the form of a TAN. In the present embodiment, each digit or piece of information is displayed individually as a prompting signal (52). By means of an input means (20), e.g. a finger or input pen, the user performs an input in the form of a swiping gesture (22) from the marking (16) towards the edge of the card-shaped object (10). Figuratively speaking, the user "swipes or slides" the number from the marked input area (16) on the card (10) over the edge of the card onto the screen (30). After the currently displayed instruction (52) has been executed, the next instruction (52) will be displayed until all digits of the information (50) have been entered by the user.

During the input (22) by the user, a time-dependent signal (not shown) is generated on the capacitive touchscreen (30). The input is in the form of a linear and essentially straight sweeping gesture (22), the course of which is shown in FIG. 3 by an arrow (dashed line). Meanwhile, the finger (20) or fingertip gradually comes into operative contact with single areas (14) of the electrically conductive structure (12). Thus, the resulting signal (not shown) on the capacitive area sensor (30) is not in the form of a straight line, as would be the case if the input were in the form of a linear and substantially straight sweeping gesture (22) without the presence of the electrically conductive structure (12) on the device (10), but the signal (not shown) is deflected by the interaction between the finger (20) and the single elements (14) of the electrically conductive structure.

The detected time-dependent signal (40) is evaluated by the device (32) comprising the area sensor (30) and compared to reference data, wherein authentication is performed depending on whether the detected signal (40) can be generated by a combination of the first and second authentication factors, i.e. can be generated by a combination of the electrically conductive structure (12) and the input of the information (50).

Figure 4:
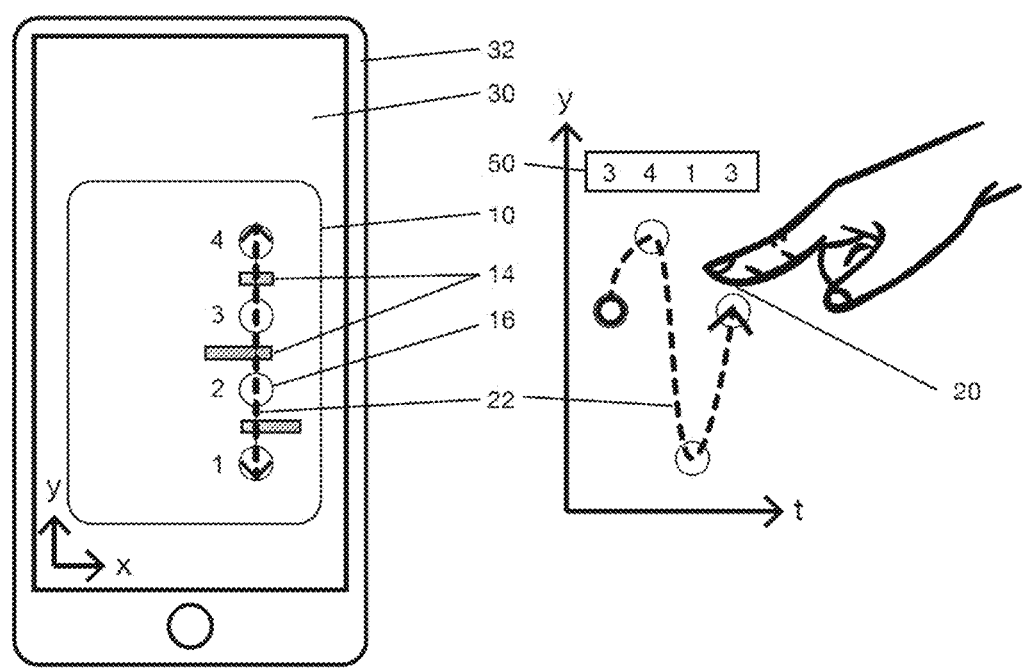
FIG. 4 shows an example of part of the method for multi-factor authentication on a device with a capacitive area sensor using the example of entering the sequence of digits "3-4-1-3", where this sequence of digits is chosen as an example of the information representing the second authentication factor in accordance with embodiments of the invention.

FIG. 4 shows a method for multi-factor authentication on a device (32) with a capacitive area sensor (30). The device (32) in the present example is a smartphone.

The device (10) includes an electrically conductive structure (not labeled for clarity) comprising multiple single elements (14) arranged on a non-conductive substrate. In the example shown, the device (10) is a card-shaped object. The electrically conductive structure (12) represents the first authentication factor. In addition, marked input areas (16) are arranged on the device (10). In the present embodiment, the marked input areas (16) comprise four fields or areas, each labeled with a number.

FIG. 4 shows an example of part of the method for multi-factor authentication on a device (32) with a capacitive area sensor (30) using the example of entering the sequence of digits "3-4-1-3." For the purpose of the invention, this sequence of digits chosen as an example is the information (50) representing the second authentication factor. The method comprises placing the device (10) in the form of a card-shaped object onto the capacitive touchscreen (30) by the user and then entering an input sequence (24). The information (50) can be, for example, a PIN known to the user or an unlock gesture known to the user or a TAN transmitted to the user.

The user performs an input in the form of a swipe gesture (22) using an input means (20), e.g. a finger or input pen, and gradually connects the individual digits of the sequence of digits by swiping from one marking (16) to the next marking (16). Figuratively speaking, the user connects the digits by gradually sweeping from one digit to another. In the right part of the graph, the course of the input gesture (22) is shown in a diagram in which the y-coordinate of the input gesture (22) has been qualitatively plotted as a function of the time t. In other words, the user sweeps up or down and stops the relative movement whenever a digit or mark (16) is reached. In this example, the user starts at marking (16) with the digit "3," then sweeps upward to the digit "4," then downward to the digit "1," and finally upward again to the digit "3."

During the input (22) by the user, a time-dependent signal (not shown) is generated on the capacitive touchscreen (30). The input is in the form of a linear and essentially straight swipe gesture (22) in two different directions, the course of which is shown in FIG. 4 by an arrow (dashed line) and in the diagram, respectively. Meanwhile, the finger (20) or fingertip gradually comes into operative contact with single areas (14) of the electrically conductive structure (12). Thus, the resulting signal (not shown) on the capacitive area sensor (30) is not in the form of a straight line as would be the case if the input were in the form of a linear and substantially straight swipe gesture (22) without the presence of the electrically conductive structure (12) on the device (10), but rather the signal (not shown) is deflected by the interaction between the finger (20) and the single elements (14) of the electrically conductive structure.

The detected time-dependent signal (40) is evaluated by the device (32) including the area sensor (30) and compared to reference data, wherein authentication is performed depending on the likelihood with which the detected signal (40) was generated by a combination of the first and second authentication factors, i.e. by a combination of the electrically conductive structure (12) and the input of the information (50).

Figure 5A:
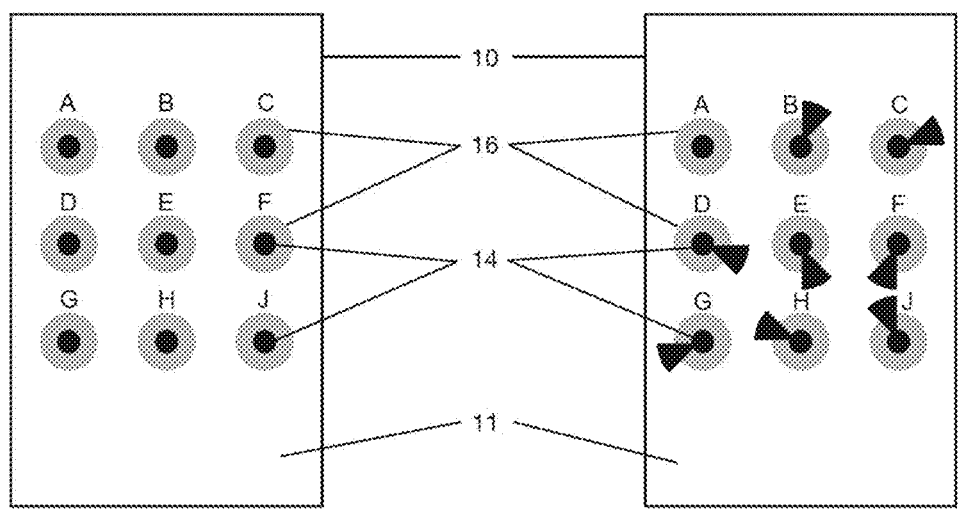
FIG. 5a shows an apparatus for performing a method for multi-factor authentication on a card-shaped device having a capacitive area sensor, where the device includes an electrically conductive structure (not labeled for clarity), with the set of all single elements of the electrically conductive structure, arranged on a non-conductive substrate, and the electrically conductive structure includes nine single elements each and represents the first authentication factor, and in addition, markings of the input areas are arranged on the device (shown in gray) in accordance with embodiments of the invention.

FIG. 5a shows an apparatus (10) for performing a method for multi-factor authentication on a device (32) having a capacitive area sensor (30). The device (10) comprises an electrically conductive structure (not labeled for clarity), consisting of the set of all single elements (14) of the electrically conductive structure, arranged on a non-conductive substrate (11). In the example shown, the device (10) is a card-shaped object. In the present embodiment, the electrically conductive structure (12) comprises nine single elements (14) each and represents the first authentication factor. In addition, markings of the input areas (16) are arranged on the device (10) (shown in gray). In the present embodiment, the marked input areas (16) comprise nine fields or keys.

The left portion of FIG. 5a depicts the device (10) with a reference structure of the electrically conductive structure (12). All electrically conductive elements (14) are centered relative to the respective marking (16) in each case. In the right part of FIG. 5a, some single elements (14) of the electrically conductive structure have extensions in the form of circular ring segments or wedges or "pie segments" pointing in different directions.

Figure 5B:
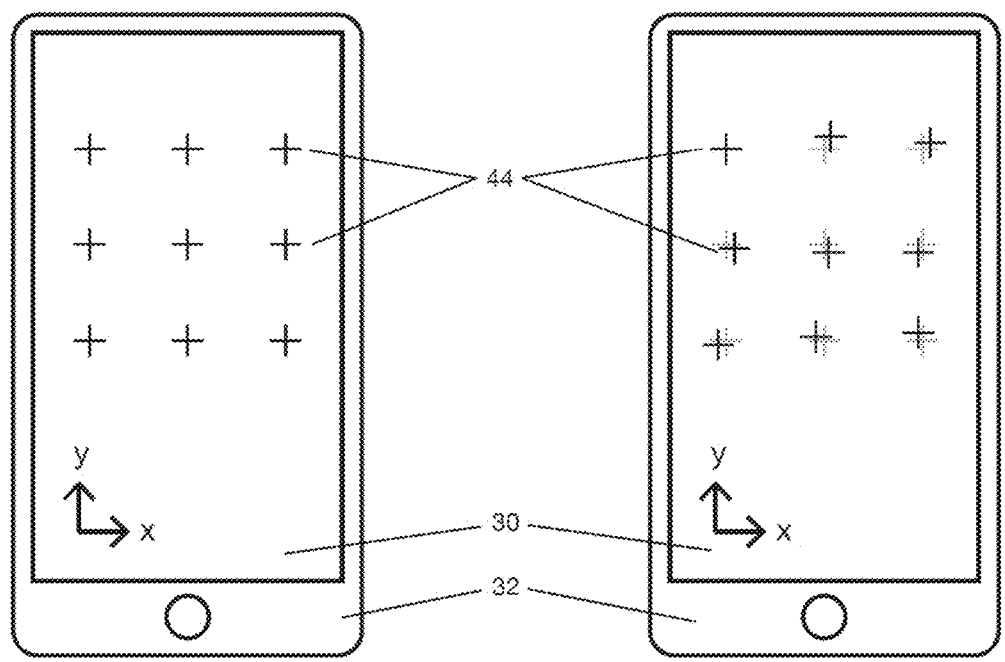
FIG. 5b shows the touch events that can be generated on the capacitive touchscreen when input is provided by the user on the card of FIG. 5a in accordance with embodiments of the invention.

FIG. 5b shows an example of part of the method for multi-factor authentication on a device (32) comprising a capacitive area sensor (30) using the example of entering the letter sequence "ABCDEFGHJ." For the purpose of the invention, this sequence of letters chosen as an example is the information (50) representing the second authentication factor. The method comprises placing the device (10) in the form of a card-shaped object onto the capacitive touchscreen (30) by the user and then performing an input sequence. The information (50) can be, for example, a PIN known to the user or an unlock gesture known to the user or a TAN transmitted to the user. The user performs the input by progressively tapping the corresponding markings A-J (16) on the device (10) while the card-shaped object (10) is placed on the capacitive area sensor (30). The input gesture is comparable to entering a number combination, for example when entering a PIN at an ATM. Touch events (44) are generated on the capacitive touchscreen (30) during the user input. When input is made by tapping, the input means (not shown) is in operative contact with single areas (14) of the electrically conductive structure (12). The resulting touch events (44) are generated depending on the shape, form, size, position of the respective single element (14) of the electrically conductive structure (12).

FIG. 5b shows the touch events (44) that can be generated on the capacitive touchscreen (30). The left part of FIG. 5b shows the touch events (44) that can be generated when input is provided by the user on the card (10) shown in the left part of FIG. 5a. All touch events (44) are centered relative to the marking (16) and also centered relative to the single elements (14) of the electrically conductive structure (12). The right part of FIG. 5b shows the touch events (44) that can be generated when input is provided by the user on the card (10) shown in the right part of FIG. 5a. The relative position of the touch events (44) compared to the position of the touch events (44) in the left part of the graphic is shifted or deflected, i.e. the touch events (44) are not centered relative to the marked input areas (16). The deflection corresponds in direction and strength to the position and size of the wedges or circular ring segments of the single elements (14) of the electrically conductive structure (12). To illustrate the displacement, the centered touch events from the left graph 5b are additionally shown in light gray (these cannot be generated by the card (10) in the right part of FIG. 5a).

In the present invention, the set of generated touch events (44) is referred to as a time-dependent signal (40). The detected time-dependent signal (40) is evaluated by the device (32) including the area sensor (30) and compared to reference data, wherein authentication is performed depending on the likelihood with which the detected signal (40) was generated by a combination of the first and second authentication factors, i.e. by a combination of the electrically conductive structure (12) and the input of the information (50).

Figure 6:
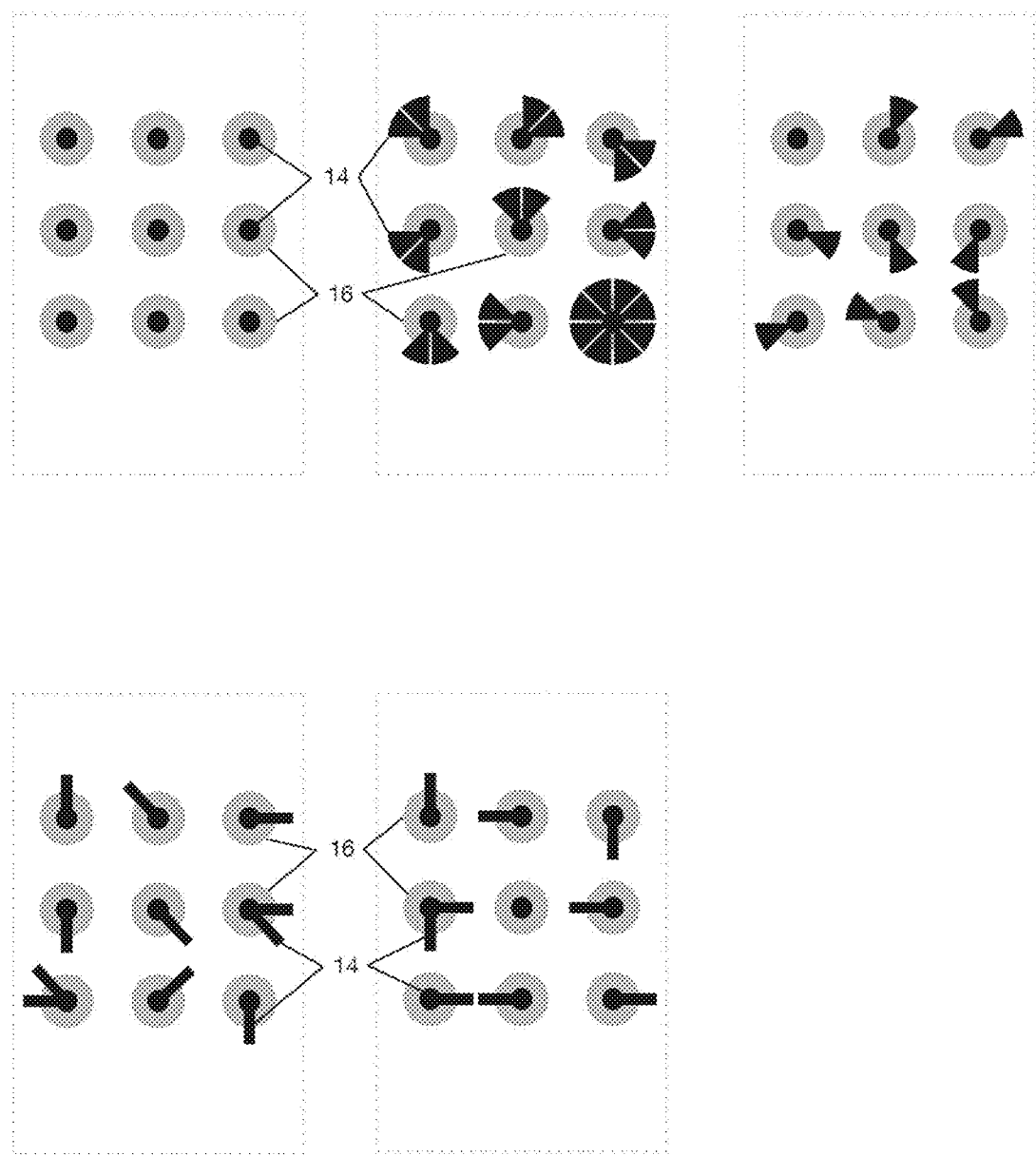
FIG. 6 shows various types of single elements of the electrically conductive structure in accordance with embodiments of the invention.

FIG. 6 shows other embodiments of the single elements (14) of the electrically conductive structure (12) present on the device. The wedges or circular ring segments can, for example, be combined into pairs or be in a different shape. In addition to wedges or circular ring segments, other shapes of the single elements (14) are possible. FIG. 6 shows at the bottom linear single elements (14) which can also be combined to form pairs, for example. A person skilled in the art is aware that FIG. 6 shows only a small selection of possible embodiments of the single elements and that many other forms of the single elements (14) are possible. Each single element (14) is self-contained, i.e. has exactly one circumferential contour line.

Figure 7:
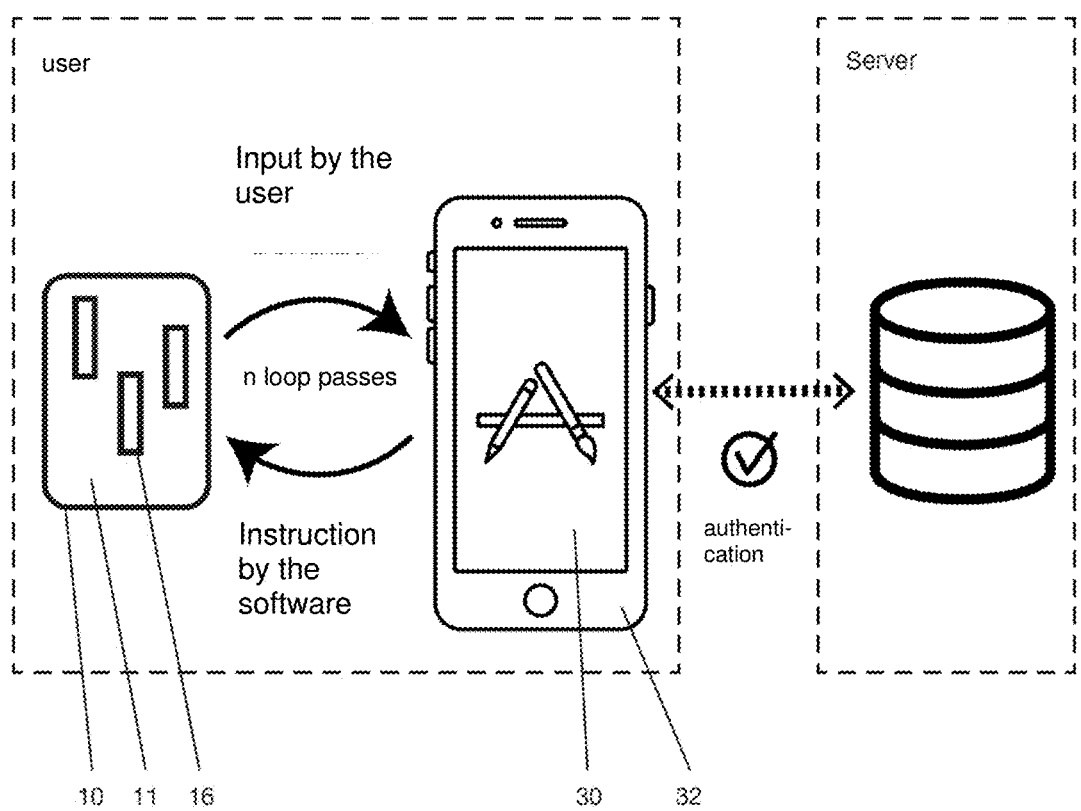
FIG. 7 shows a method for multi-factor authentication on a device with a capacitive area sensor in which the evaluation is not performed on the device itself but on a server in accordance with embodiments of the invention.

FIG. 7 shows a method for multi-factor authentication on a device (32) with a capacitive area sensor (30) in which the evaluation is not performed on the device (32) itself but on a server, comprising the following steps:

- a) providing a device (32) comprising a capacitive area sensor (30)
- b) providing a device (10) with an electrically conductive structure (not shown) on a non-conductive substrate (11), wherein the electrically conductive structure represents a first authentication factor
- c) Placing the device (10) onto the capacitive area sensor (30)
- d) Passing of n loops: Request/input/transmission
  - i. Providing (partial) information for the execution of an input in the form of at least one prompting signal on the device (10)
  - ii. Performing an input sequence on the device (10) using an input means (not shown)
  - iii. Transmission of the signal generated during the input on the area sensor (30) to a server wherein the set of all (partial) information represents a second authentication factor and the set of n inputs can be called an input sequence.
- e) Evaluating the transmitted touch data and comparing it to reference data on the server, wherein authentication is performed based on the likelihood with which the detected signal was generated by a combination of the first and second authentication factors.
- f) Transmitting the authentication result from the server back to the client or device (32) comprising the capacitive touchscreen (30).

The exemplary embodiment shows authentication using the example of a TAN entry, i.e., a transaction number or transaction entry sequence that is only valid for one transaction. Such methods are also known as one-time passwords (OTP). The device (10) includes an electrically conductive structure (not shown) and marked input areas (16). In the present example, the markings of the input areas (16) comprise three vertically arranged, strip-shaped areas which are translucent or transparent or completely cut out/recessed.

The user opens an application on the smartphone (32), for example, an app or a website. In the application, the user is prompted to place the device (10) or card on the touchscreen (30) of the smartphone (32). After this is done, a prompting signal is transmitted to the user by visual and/or acoustic and/or haptic cues, e.g. by displaying and/or animating cues on the touchscreen in the area of the markings of the input areas (16), for example in the form of arrows, color gradients, symbols, etc., which are suitable for prompting the user to perform a gesture in a certain direction along one of the markings (16).

During the input, the signal (40) generated on the touchscreen (30) is recorded and the corresponding touch data is transmitted to the server accordingly. The shape and the course of the signal depend on the input by the user and on the arrangement and shape of the electrically conductive structure. The sequence "Display prompting signal"—"Input by user"—"Transmission of touch data to the server is repeated n times. The number of required inputs can be controlled by the system and adapted to the safety requirements of the application. The more input is required from the user, the more secure is the authentication.

When all signals have been transmitted to the server, evaluation of the transmitted touch data and comparison with reference data is performed on the server, and authentication is performed depending on whether the generated signal (40) can be generated by a combination of the first and second authentication factors. Subsequently, the authentication result is transmitted from the server back to the client or the device (32) comprising the capacitive touchscreen (30), where it is displayed or the user is given access to a secured area and/or a requested transaction is performed.

Figure 8:
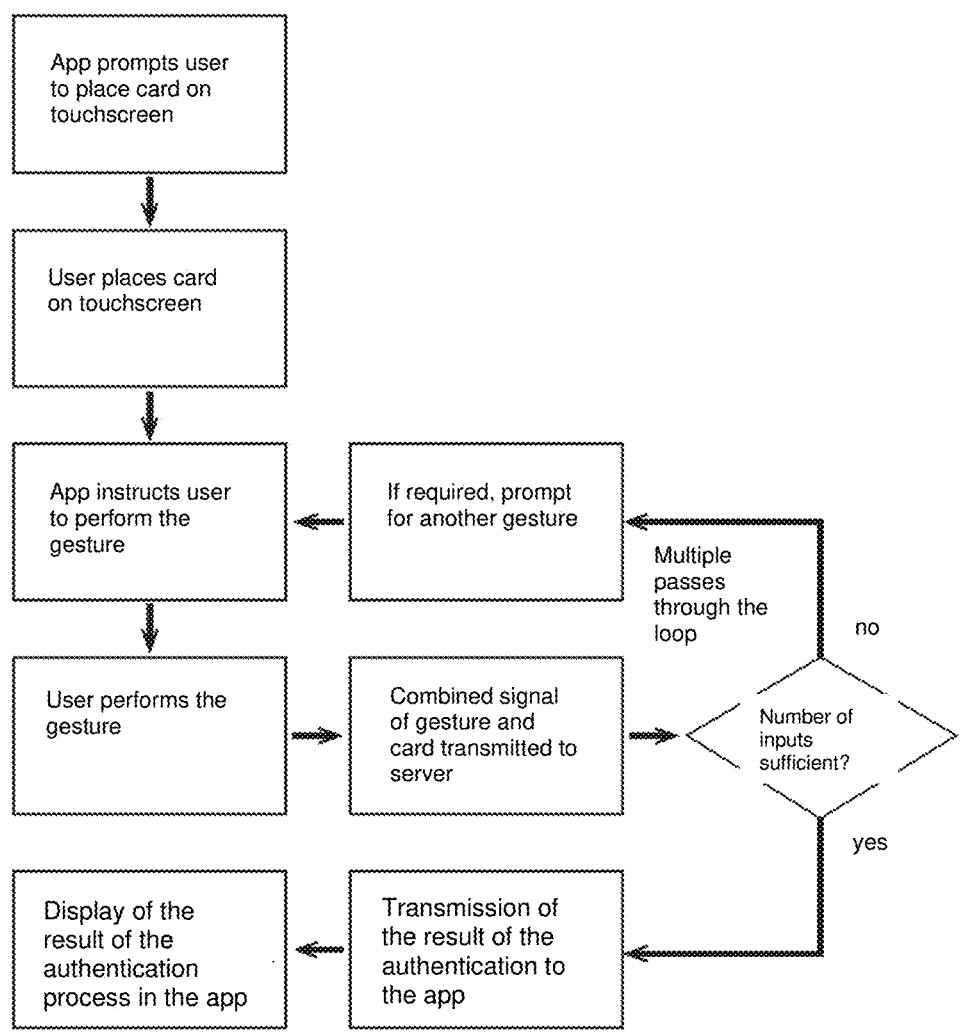
FIG. 8 shows the sequence described in FIG. 7 as a flow chart in accordance with embodiments of the invention.

FIG. 8 shows the sequence described in FIG. 7 again as a flow chart.

Figure 9:
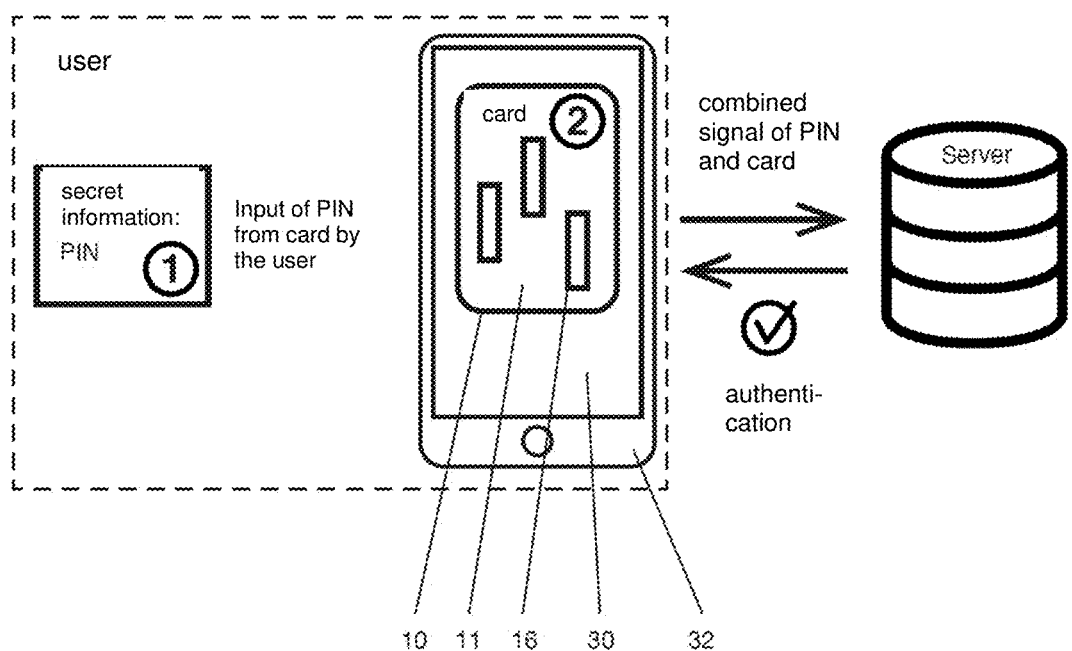
FIG. 9 shows a method for multi-factor authentication on a device with a capacitive area sensor in which the evaluation is not performed on the device itself but on a server in accordance with embodiments of the invention.

FIG. 9 shows a method for multi-factor authentication on a device (32) with a capacitive area sensor (30) in which the evaluation is not performed on the device (32) itself but on a server, comprising the following steps:

- i) providing a device (32) comprising a capacitive area sensor (30)
- j) providing a device (10) with an electrically conductive structure (not shown) on a non-conductive substrate (11), wherein the electrically conductive structure represents a first authentication factor
- k) placing the device (10) onto the capacitive area sensor (30)
- l) providing information for executing an input sequence on the device, wherein the information represents a second authentication factor
- m) performing an input sequence on the device (10) using an input means (not shown)
- n) transmitting the signal (40) generated on the area sensor (30) during the input sequence to a server
- o) evaluating the transmitted touch data and comparing it with reference data on the server, wherein authentication is performed depending on whether the generated signal (40) can be generated by a combination of the first and second authentication factors.
- p) Transmitting the authentication result from the server back to the client or device (32) comprising the capacitive touchscreen (30).

The exemplary embodiment shows the authentication using the example of a PIN input, i.e., a personal identification number, and identification sequence known to the user. The device (10) includes an electrically conductive structure (not shown) and markings of input areas (16). In the present example, the markings of the input areas (16) comprise three vertically arranged, strip-shaped areas. The user opens an application on the smartphone (32), for example, an app or a website. In the application, the user is prompted to place the device (10) or card on the touchscreen (30) of the smartphone (32). The user then enters an input sequence by performing at least two gestures along the markings of the input areas (16) in a specific direction. Knowledge of the number, shape, direction and sequence of the gestures is only known to the user, comparable to a PIN on a bank card. In the present invention, the set of gestures performed is referred to as the input sequence. During the input, the signal (40) generated on the touchscreen (30) is recorded and the corresponding touch data is transmitted to the server accordingly. The shape and the course of the signal depend on the input by the user and on the arrangement and shape of the electrically conductive structure. When all signals have been transmitted to the server, evaluation of the transmitted touch data and comparison with reference data is performed on the server, and authentication is performed depending on whether the generated signal (40) can be generated by a combination of the first and second authentication factors. Then, the authentication result is transmitted from the server back to the client or the device (32) comprising the capacitive touchscreen (30), where it is displayed or the user is given access to a secured area.

REFERENCE NUMERALS

- 10 device, particularly card-like object
- 11 electrically non-conductive substrate
- 12 electrically conductive structure
- 14 single elements or single areas of the electrically conductive structure
- 16 visually marked input areas (graphic or cutout)
- 18 prompting signal
- 20 input means, especially a finger
- 22 input, particularly sweeping motion, typing movement, relative movement, or gesture
- 24 input sequence
- 30 area sensor, particularly capacitive touchscreen or touchscreen
- 32 device containing area sensor, particularly smartphone
- 40 time-dependent signal
- 44 touch event
- 50 information
- 52 instruction or prompting signal

The invention claimed is:

1. A method for multi-factor authentication on a device (32) with a capacitive area sensor (30), comprising
   a) providing a device (32) comprising a capacitive area sensor (30);
   b) providing a device (10) with an electrically conductive structure (12) on a non-conductive substrate (11), wherein the electrically conductive structure (12) represents a first authentication factor;
   c) providing information (50) for executing an input sequence on the device (10), wherein the information (50) represents a second authentication factor;
   d) placing the device (10) onto the capacitive area sensor (30);
   e) performing an input sequence on the device (10) using an input means (20); and
   f) evaluating a signal (40) detected by the area sensor (30) during the input sequence and comparing it to reference data, wherein authentication is performed based on the likelihood with which the detected signal (40) was generated by a combination of the first and second authentication factors
characterized in that
   the device (10) has visually marked input areas (16) for performing a plurality of input sequences, wherein the visually marked input areas (16) are strip-shaped areas and the input sequence corresponds to a sequence of sweeping substantially straight motions (22) on the strip-shaped areas, and
   wherein the electrically conductive structure (12) comprises multiple single elements (14) which are galvanically isolated from each other and arranged in a single layer, wherein the single elements (14) overlap with one or several of the strip-shaped visually marked input areas (16), such that when an input (22) is performed in the form of a substantially straight sweeping motion (22) using an input means (20) on one of the strip-shaped visually marked input areas (16) the signal (40) detected by the area sensor (30) is not in the form of a straight line, but is deflected by an interaction between the input means (20) and the single element (14).

2. The method according to claim 1,
characterized in that
the device (32) comprises a capacitive touchscreen (30) and the device (32) processes the signal (40) as a set of touch events (44).

3. The method according to claim 1,
characterized in that
the device (10) is a card-shaped object.

4. The method according to claim 1,
characterized in that
the input sequence includes at least one swipe gesture, one unlock gesture, and/or a sequential input of a sequence of numbers, letters, or symbols.

5. The method according to claim 1,
characterized in that
the visually marked input areas (16) are strip-shaped areas at the ends of which numbers, letters, and/or symbols are marked, and in that the input sequence corresponds to a sequence of sweeping motions (22) on the strip-shaped areas.

6. The method according to claim 1,
characterized in that
the device (10) has recesses and/or transparent areas, such that when the device (10) is placed onto the capacitive area sensor (30), preferably the touchscreen, optical prompting signals (52) generated by the device (32) are visible as instructions for performing an input sequence.

7. The method according to claim 1,
characterized in that
the second authentication factor is transmitted to the device (32) and/or is stored on the device (32), wherein preferably the device (32) outputs the second authentication factor in the form of an optical prompting signal (52), an acoustic prompting signal, and/or in the form of a separate message for instructing an input sequence.

8. A device (10) for performing a method for multi-factor authentication on a device (32) with a capacitive area sensor (30), wherein the device (10) comprises an electrically conductive structure (12) on a non-conductive substrate (11), wherein
   the electrically conductive structure (12) represents a first authentication factor and the device (10) has strip-shaped visually marked input areas (16) for performing a plurality of input sequences, an input sequence of which can represent a second authentication factor, such that, when placing the device (10) onto the capacitive area sensor (30) and performing the input sequence on the device (10) using an input means (20), a signal detected during the input sequence by the area sensor (30) can be evaluated and authentication can be performed based on a comparison to reference data in accordance with the likelihood with which the detected signal was generated by a combination of the first and second authentication factors
characterized in that
   the device (10) has visually marked input areas (16) for performing a plurality of input sequences, wherein the visually marked input areas (16) are strip-shaped areas and the input sequence corresponds to a sequence of substantially straight sweeping motions (22) on the strip-shaped areas, and wherein the electrically conductive structure (12) comprises multiple single elements (14), which are galvanically isolated from each other and arranged in a single layer, wherein the single elements (14) overlap with one or several of the visually marked input areas (16), such that when an input (22) is performed in the form of a substantially straight sweeping motion (22) using an input means (20) on one of the strip-shaped visually marked input areas (16) the signal (40) detected by the area sensor (30) is not in the form of a straight line, but is deflected by an interaction between the input means (20) and the single element (14).

9. The device (10) according to claim 8, characterized in that
the device (10) is a card-shaped object.

10. The device (10) according to claim 8, characterized in that
the respective ends of the visually marked input areas (16) are arranged as strip-shaped areas for performing a sweeping motion (22) are marked by numbers, letters, and/or symbols.

11. The device according to claim 8, characterized in that
the electrically conductive structure (12) comprises multiple line-shaped single elements (14) and each strip-shaped area overlaps with at least one line-shaped single element (14), wherein preferably the line-shaped single elements (14) are arranged orthogonally to the input areas (16) and have different lengths.

12. The device according to claim 8, characterized in that
the device (10) has recesses and/or transparent areas, such that, when the device (10) is placed onto the capacitive area sensor (30), optical prompting signals (52) generated by the device (32) are visible as instructions for performing an input sequence (24).

13. A kit for multi-factor authentication on a device (32) with a capacitive area sensor (30), comprising
a) a device (10) according to claim 8; and
b) a software ('app') for installation on the device (32), comprising commands for evaluating a signal (40) generated during an input sequence on the area sensor (30) for comparing the generated signal (40) to reference data and for authentication based on the likelihood with which the detected signal (40) was generated by a combination of the first and second authentication factors.

14. A system for multi-factor authentication on a device (32) with a capacitive area sensor (30), comprising
a) a device (10) according to claim 8; and
b) a device (32) with a capacitive area sensor (30),
the device comprising an electrically conductive structure (12) which represents a first authentication factor and the device (10) having visually marked input areas (16) for performing a plurality of input sequences, an input sequence of which can represent a second authentication factor, such that, when placing the device (10) onto the capacitive area sensor (30) and performing the input sequence on the device (10) using an input means (20), a signal detected during the input sequence by the area sensor (30) can be evaluated and authentication can be performed based on a comparison to reference data in accordance with the likelihood with which the detected signal was generated by a combination of the first and second authentication factors,
wherein the system has a data processing device which is adapted to evaluate the generated signal (40), wherein preferably a software ('app') is installed on the data processing device comprising commands for evaluation of a signal (40) detected during an input sequence on the area sensor (30), for comparing the detected signal (40) to reference data and for authenticating based on the likelihood with which the generated signal (40) was generated by a combination of the first and second authentication factors.

* * * * *